US008353458B2

(12) United States Patent
Nobutani

(10) Patent No.: US 8,353,458 B2
(45) Date of Patent: Jan. 15, 2013

(54) NETWORK SYSTEM, CABLE SET, AND METHOD AND PROGRAM FOR CONTROLLING NETWORK SYSTEM

(75) Inventor: Tsutomu Nobutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1359 days.

(21) Appl. No.: 12/065,075

(22) PCT Filed: Aug. 23, 2006

(86) PCT No.: PCT/JP2006/317034
§ 371 (c)(1),
(2), (4) Date: Feb. 27, 2008

(87) PCT Pub. No.: WO2007/029572
PCT Pub. Date: Mar. 15, 2007

(65) Prior Publication Data
US 2009/0262382 A1  Oct. 22, 2009

(30) Foreign Application Priority Data

Sep. 7, 2005 (JP) ................. 2005-258841
Sep. 7, 2005 (JP) ................. 2005-258846
Sep. 7, 2005 (JP) ................. 2005-258847

(51) Int. Cl.
*G06K 19/05* (2006.01)
(52) U.S. Cl. ...................... 235/492; 235/375
(58) Field of Classification Search .................. 235/492, 235/375, 380, 487
See application file for complete search history.

(56) References Cited

U.S. PATENT DOCUMENTS

| | | | | |
|---|---|---|---|---|
| 6,018,690 A * | 1/2000 | Saito et al. | ...... | 700/295 |
| 6,301,674 B1 | 10/2001 | Saito et al. | ...... | 713/340 |
| 6,710,993 B1 | 3/2004 | Wang | ...... | 361/93.1 |
| 6,810,481 B1 | 10/2004 | Kawade et al. | ...... | 713/300 |
| 7,049,939 B2 | 5/2006 | Ikeda et al. | | |
| 7,290,163 B2 | 10/2007 | Yanagihara | | |
| 7,391,743 B2 * | 6/2008 | Momozono et al. | ...... | 370/254 |
| 2003/0043028 A1 | 3/2003 | Torikai et al. | ...... | 340/310.01 |
| 2005/0147091 A1 | 7/2005 | Momozono et al. | ...... | 370/356 |

FOREIGN PATENT DOCUMENTS

| | | |
|---|---|---|
| JP | 05-022365 | 1/1993 |
| JP | 05022365 A | 1/1993 |
| JP | 05235955 A | 9/1993 |
| JP | 05-298875 | 11/1993 |
| JP | 08076903 A | 3/1996 |
| JP | 08240748 A | 9/1996 |
| JP | 09185437 A | 7/1997 |
| JP | 10-094199 | 4/1998 |
| JP | 2001-075682 | 3/2001 |
| JP | 2001-168868 | 6/2001 |
| JP | 2001160462 A | 6/2001 |
| JP | 2001168868 A | 6/2001 |
| JP | 2001197151 A | 7/2001 |

(Continued)

*Primary Examiner* — Daniel St.Cyr
(74) *Attorney, Agent, or Firm* — DLA Piper LLP (US)

(57) ABSTRACT

A network system is provided with a cable set having a nonvolatile memory module mounted thereon, and a printer connected by the cable set. The printer is provided with a set information read means for reading set information for performing initial setting of itself from a nonvolatile memory module of the connected cable set, and an initial setting means for performing initial setting based on the read set information.

29 Claims, 18 Drawing Sheets

FOREIGN PATENT DOCUMENTS

| | | |
|---|---|---|
| JP | 2002-009779 | 1/2002 |
| JP | 2003044179 A | 2/2003 |
| JP | 2003-078456 | 3/2003 |
| JP | 2003152764 A | 5/2003 |
| JP | 2003174490 A | 6/2003 |
| JP | 2003229865 A | 8/2003 |
| JP | 2004-072296 | 3/2004 |
| JP | 2004088771 A | 3/2004 |
| JP | 2004-515034 | 5/2004 |
| JP | 2005-026825 | 1/2005 |
| JP | 2005-176279 | 6/2005 |

* cited by examiner

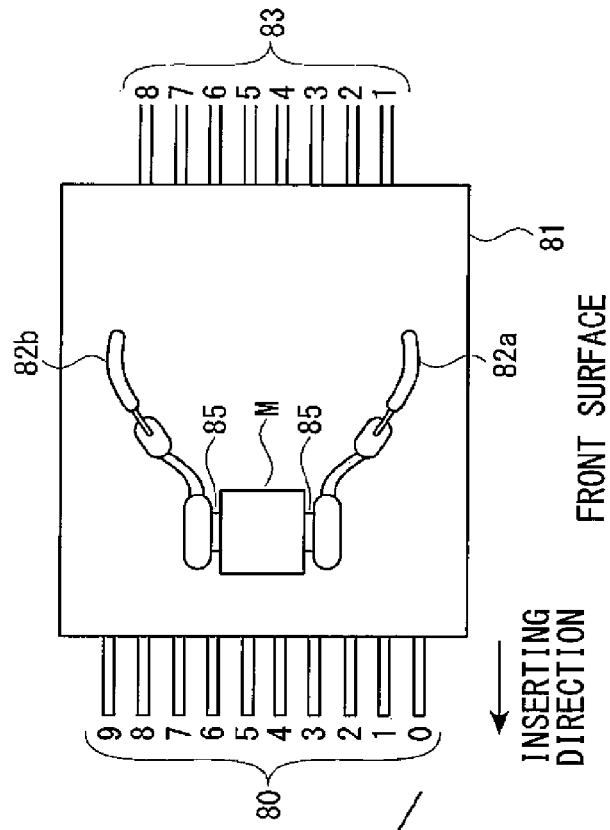
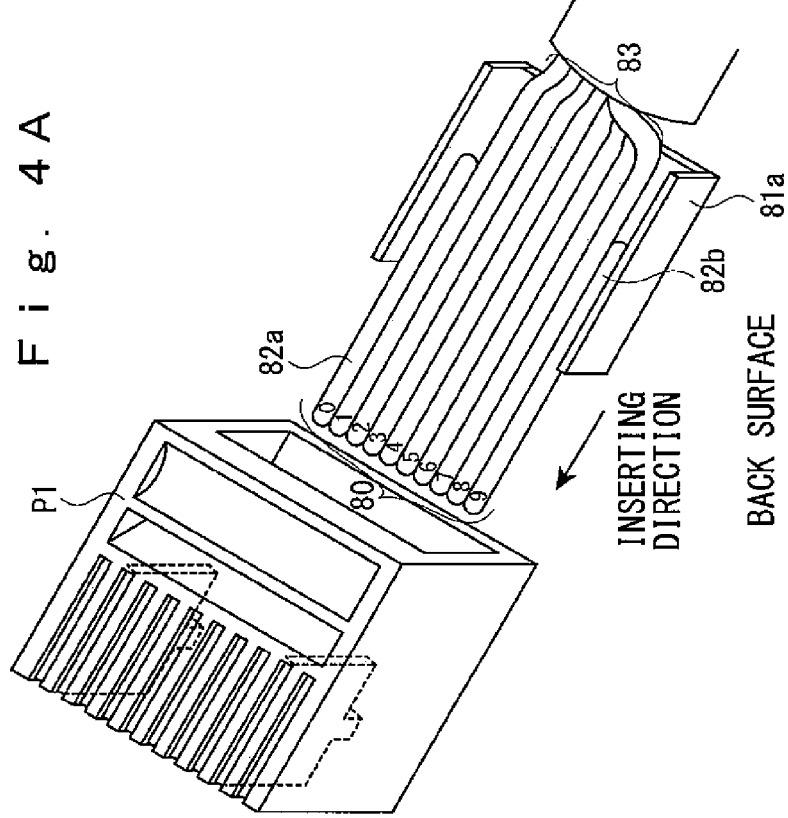

NETWORK SYSTEM, CABLE SET, AND METHOD AND PROGRAM FOR CONTROLLING NETWORK SYSTEM

CROSS-REFERENCE TO THE RELATED APPLICATIONS

This application is a national stage of international application No. PCT/JP2006/317034 filed Aug. 23, 2006, which also claims benefit of priority under 35 U.S.C. §119 to Japanese patent application Nos. 2005-258841, 2005-258846 and 2005-258847 which were filed on Sep. 7, 2005, the entire contents of all of which are incorporated herein by reference.

TECHNICAL FIELD

The present invention relates to a network system including devices and a cable set for connecting the devices or an RFID enabling a wireless communication, a cable set, and a method and a program for controlling network system.

BACKGROUND ART (First Background Art)

In a network system in which a plurality of devices are connected, in order to identify devices which become communication targets, a control address such as an IP address is written or a hardware address uniquely allocated to an apparatus such as a MAC address is used. For this reason, in a case where a device is replaced or an arrangement change of the device is performed, each time, it is necessary to conduct an initial setting by assigning an IP address to a new device or registering an MAC address allocated to a new device.

However, the initial setting of this type is difficult for an ordinary user to conduct and it is necessary to ask a service company, which leads to a high maintenance cost. In view of the above, as one of solutions for such a problem, an IP address setting method of automatically allocating an IP address to each device connected to a network by using a DHCP is known. Still, even if this DHCP is used, in a case where an IP address is set in accordance with an installation location, it is necessary to associate the IP address with the MAC address in advance. Thus, each time the device is replaced or the arrangement change is performed, this association operation needs to be carried out.

Also, as a method of facilitating the IP address setting, Japanese Unexamined Patent Application Publication No. 2005-176279 discloses a network system in which each device connected to a network automatically transmits an IP address to a management apparatus for managing IP addresses when a power supply is turned ON, and thus a setting operation of IP addresses for the management apparatus becomes unnecessary.

(Second Background Art)

Up to now, in order to prevent an overload of a power supply socket or an electronic circuit, a large number of countermeasures are proposed such as "apparatus for performing overload protection for circuit" described in PCT Japanese Translation Patent Publication 2004-515034.

(Third Background Art)

Up to now, in order to prevent a tapping or an unauthorized access in a network system including a LAN or the like, a large number of countermeasures are proposed such as "method for secret protection in network data transfer" disclosed in Japanese Unexamined Patent Application Publication No. 2005-26825.

In addition, as a countermeasure commonly used, a security function referred to as "MAC address filtering" is famous. According to this MAC address filtering, a MAC address of a device (a device connected to a network) which is permitted to perform a communication (an inherent hardware address of the apparatus) is registered in advance in a router or an access point (a network relay apparatus). Only in a case where the registered MAC address is matched with a transmission source MAC address of the device which requests the communication, an access is permitted. Then, a communication of a device other than the registered device (a communication from outside of the network) is rejected.

(Fourth Background Art)

In a case where a plurality of printers are connected on a network and a use/management is carried out, in order to distinguish the respective printers, a network address is assigned to each printer and the use/management is carried out on the basis of the network address.

An example of a use management method for the printers includes a method of using two types of network addresses, which are a MAC address assigned to a NIC (network interface card) of a printer and an IP address of a printer directly assigned by a user. In a case where a communication is conducted between two information instruments (for example, between a printer and a management server), a transmission source information instrument performs a communication by transmitting a packet in which at least a transmission source IP address and a MAC address of an adjacent information instrument (for example, a router) are added to data.

In addition, an example of a method of assigning an IP address to an information instrument includes a method of directly assigning the IP address, but such a method is known that a server broadcasts a setting protocol including a MAC address of a printer on a network, and when a MAC address which a printer has is matched with the MAC address of the setting protocol, an IP address of the setting protocol is obtained (for example, Japanese Unexamined Patent Application Publication No. 11-249989).

DISCLOSURE OF INVENTION

However, even in the network system described in the first background art, the setting of an IP address to each device needs to be carried out.

In view of the problem of the first background art, a first object of the present invention is to provide a network system in which an initial setting such as a setting of a control address in accordance with an installation location of each device can be automatically performed, a cable set, a control method for the network system, and a program.

On the other hand, the overload protection apparatus disclosed in the second background art is adapted to prevent the overload during the power supply, but the overload cannot be expected in advance. That is, with respect to a power supply request from a side receiving a power supply feed, in a case where a power supply output capacity on a side performing the power supply feed is too large, there is a fear that a breakdown of a power supply circuit due to the overload, but there is no means to determine this situation.

In view of the problem of the second background art, a second object of the present invention is to provide a network system in which an appropriate power supply feed can be performed between two devices on the side performing the power supply feed and the side receiving the power supply feed, a cable set, a control method for the network system, and a program.

On the other hand, as described in the third background art, in a case where the MAC address filtering is used, in order to determine whether the access is permitted or not on the basis of the transmission source MAC address in the above-mentioned manner, if the device connected to the network is replaced, each time, it is necessary to register or change a MAC address of a new device, which is troublesome.

In view of the problem of the third background art, a third object of the present invention is to provide a network system in which in a case where the device connected to the network is replaced, it is possible to omit a registration or change of a hardware address of a new device to a network relay apparatus having the address filter function which is also connected to the network, a cable set, a control method for the network system, and a program.

On the other hand, as described in the fourth background art, in a case where another information instrument is arranged at a particular location where the printer is used and the printer is intended to be operated together with the information instrument, when a network to which the printer belongs and a network to which the other information instrument belongs are independently managed, if only the setting protocol is simply broadcast, the information instrument cannot correspond to the printer. Thus, the printer cannot be operated in cooperation with the information instrument.

For example, in a system where a voucher for discount is provided in cooperation with a POS register such as a retail shop, in accordance with one lane (a particular location), the POS register and the printer for printing the voucher are arranged. These form a pair, and information on a purchased product is obtained by the POS register. Then, the printer prints a voucher in accordance with the information on the purchased product. However, although the printer can receive the information on the product from the POS register, in a case where a communication cannot performed from the printer to the POS register, that is, in a case where a bidirectional communication between the POS register and the printer cannot be performed, the following problem is generated.

When the printer suffers a failure and a replacing printer is to be arranged, a new network address needs to be assigned to the replacing printer. Even if the IP address is assigned to the printer by the DHCP server, information on the IP address cannot be associated with address information of the POS register, and therefore the printer cannot be operated in cooperation with the POS register. Also, an IP address of the printer corresponding to the POS register is determined in advance and the IP address may be directly set for the replacing printer, but this is troublesome. Furthermore, at this time, knowledge on the IP address setting is also required.

In view of the problem of the fourth background art, a fourth object of the present invention is to provide a network system in which the network address of the printer can be easily set in accordance with the use location irrespective of the network configuration, a cable set, a control method for the network system, and a program.

According to the present invention, there is provided a network system includes: a cable set to which a non-volatile memory is mounted; and a device to which the cable set is connected, the network system being characterized in that the device includes: set information read means for reading set information used for performing an initial setting of itself from the non-volatile memory of the connected cable set; and initial setting means for performing an initial setting on the basis of the read set information.

According to another present invention, there is provided a network system, including: a hub for a network to which a non-volatile memory is mounted; and a device connected to the hub, the network system being characterized in that: the hub includes: set information read means for reading set information used for performing an initial setting of a device connected to each port on the hub from the mounted non-volatile memory; and set information transmission means for performing a communication with the device based on the read set information and transmitting the read set information to the device; and the device includes: set information obtaining means for obtaining the set information transmitted by the set information transmission means; and initial setting means for performing an initial setting on the basis of the obtained set information.

According to another present invention, there is provided a network system, including: a device; and an RFID tag which is affixed at an installation location of the device and stores set information used for performing an initial setting of the device, the network system being characterized in that the device includes: set information read means for reading the set information from the RFID tag via a wireless communication; and initial setting means for performing an initial setting on the basis of the read set information.

According to another present invention, there is provided a network system, including: a cable set to which a non-volatile memory is mounted; a first device which requires a power supply via the cable set; and a second device for performing the power supply via the cable set to the first device, the network system being characterized in that: the non-volatile memory stores power supply information related to a power supply request from the first device; and the second device includes: power supply information read means for reading the power supply information from the non-volatile memory of the connected cable set; power supply determination means for determining whether the power supply can be performed or not based on the read power supply information; and power supply control means for permitting the power supply to the first device in a case where the power supply determination means determines that the power supply can be performed.

According to another present invention, there is provided a network system, including: a cable set to which a non-volatile memory is mounted; a network relay apparatus in which an address filter can be set and to which the cable set is connected; and a device connected to another end of the cable set different from an end to which the network relay apparatus is connected, the network system being characterized in that: the non-volatile memory stores a cable address which is a unique hardware address allocated to each cable set and the cable address is registered in the network relay apparatus; and the device includes: address read means for reading the cable address from the non-volatile memory of the connected cable set; address storage means for storing the read cable address; and address switch means for switching a hardware address of itself to the cable address stored in the address storage means.

According to another present invention, there is provided a network system, including: a network relay apparatus in which an address filter can be set and a non-volatile memory is mounted for each port; and a device connected to the network relay apparatus via the port, the network system being characterized in that: the non-volatile memory stores a port address which is a unique hardware address allocated to each port and the port address is registered in the network relay apparatus; the network relay apparatus includes: address read means for reading the port address from the mounted non-volatile memory; and address transmission means for performing a communication with the device and transmitting the read port address to the device; and the device includes: address obtaining means for obtaining the port address transmitted by address transmission means; address storage means for storing the obtained port address; and address switch means for switching a hardware address of itself to the port address stored in the address storage means.

According to another present invention, there is provided a network system, including: a device connected to a network together with a network relay apparatus in which an address filter can be set and a hardware address is registered; and an RFID tag which is affixed at an installation location of the device and stores the hardware address, the network system being characterized in that the device includes: address read means for reading the hardware address from the RFID tag via a wireless communication; address storage means for storing the read hardware address; and address switch means for switching a hardware address of itself to the hardware address stored in the address storage means.

According to another present invention, there is provided a network system for operating a plurality of printers in a plurality of locations, the network system being characterized by including: an RFID tag which is arranged at a location where the printer is used and stores location information for identifying the location; a printer provided with location information read means for reading the location information stored in the RFID tag by using electromagnetic means; and means for associating the read location information with a network address and assigning the associated network address to the printer which has read the location information.

According to another present invention, there is provided a network system for operating a plurality of printers in a plurality of locations, the network system being characterized by including: print information which is arranged at a location where the printer is used and stores location information for identifying the location as printed information; a printer provided with location information read means for reading the location information stored in the print information by using optical means; and means for associating the read location information with a network address and assigning the associated network address to the printer which has read the location information.

According to the present invention, there is provided a cable set used for the above-mentioned network system.

According to the present invention, there is provided a control method for a network system which includes: a cable set to which a non-volatile memory is mounted; and a device to which the cable set is connected, the control method being characterized by including instructing the device to execute: a step of reading set information used for performing an initial setting of itself from the non-volatile memory of the connected cable set; and a step of performing an initial setting on the basis of the read set information.

According to another present invention, there is provided a control method for a network system which includes: a hub for a network to which a non-volatile memory is mounted; and a device connected to the hub, the control method being characterized by including: instructing the hub to execute: a step of reading set information used for performing an initial setting of a device connected to each port on the hub from the mounted non-volatile memory; and a step of performing a communication with the device based on the read set information and transmitting the read set information to the device; and instructing the device to execute: a step of obtaining the transmitted set information; and a step of performing an initial setting on the basis of the obtained set information.

According to another present invention, there is provided a control method for a network system which includes: a device; and an RFID tag which is affixed at an installation location of the device and stores set information used for performing an initial setting of the device, the control method being characterized by including instructing the device to execute: a step of reading the set information from the RFID via a wireless communication; and a step of performing an initial setting on the basis of the read set information.

According to another present invention, there is provided a control method for a network system which includes: a cable set to which a non-volatile memory is mounted; a first device which requires a power supply via the cable set; and a second device for performing the power supply via the cable set to the first device, the non-volatile memory storing power supply information related to a power supply request from the first device, the control method being characterized by including instructing the second device to execute: a step of reading the power supply information from the non-volatile memory of the connected cable set; a step of determining whether the power supply can be performed or not based on the read power supply information; and a step of permitting the power supply to the first device in a case where it is determined that the power supply can be performed.

According to another present invention, there is provided a control method for a network system which includes: a cable set to which a non-volatile memory is mounted; a network relay apparatus in which an address filter can be set and to which the cable set is connected; and a device connected to another end of the cable set different from an end to which the network relay apparatus is connected, the non-volatile memory storing a cable address which is a unique hardware address allocated to each cable set and the cable address being registered in the network relay apparatus, the control method being characterized by including instructing the device to execute: a step of reading the cable address from the non-volatile memory of the connected cable set; and a step of switching a hardware address of itself to the read cable address.

According to another present invention, there is provided a control method for a network system which includes: a network relay apparatus in which an address filter can be set and a non-volatile memory is mounted for each port; and a device connected to the network relay apparatus via the port, the non-volatile memory storing a port address which is a unique hardware address allocated to each port and the port address being registered in the network relay apparatus, the control method being characterized by including: instructing the network relay apparatus to execute: a step of reading the port address from the mounted non-volatile memory; and a step of performing a communication with the device and transmitting the read port address to the device; and instructing the device to execute: a step of obtaining the transmitted port address; a step of storing the obtained port address; and a step of switching a hardware address of itself to the stored port address.

According to another present invention, there is provided a control method for a network system which includes: a device connected to a network together with a network relay apparatus in which an address filter can be set and a hardware address is registered; and an RFID tag which is affixed at an installation location of the device and stores the hardware address, the control method being characterized by including instructing the device to execute: a step of reading the hardware address from the RFID tag via a wireless communication; and a step of switching a hardware address of itself to the read hardware address.

According to the present invention, there is provided a program for instructing a computer to execute the respective steps in the control method for the above-mentioned network.

It should be noted that the present invention can also adopt the following configurations.

A network system according to the present invention relates to a network system, including: a cable set to which a non-volatile memory is mounted; and a device to which the cable set is connected, the network system being characterized in that the device includes: set information read means for reading set information used for performing an initial setting of itself from the non-volatile memory of the connected cable set; and initial setting means for performing an initial setting on the basis of the read set information.

Also, a control method for a network system according to the present invention relates to a control method for a network system which includes: a cable set to which a non-volatile memory is mounted; and a device to which the cable set is connected, the control method being characterized by including instructing the device to execute: a step of reading set information used for performing an initial setting of itself from the non-volatile memory of the connected cable set; and a step of performing an initial setting on the basis of the read set information.

According to these configurations, the device reads the set information for performing the initial setting of itself from the non-volatile memory mounted to the connected cable set (the cable provided with the non-volatile memory), and the initial setting can be automatically performed on the basis of the set information. That is, it is unnecessary to perform the operation for the initial setting by an operator, and thus the reduction of the maintenance cost for the network system can be achieved. Also, this is effective in a case where the initial setting in accordance with the installment location of each device is performed (such as the setting of the control address).

In the above-mentioned network system, the set information read means preferably reads the set information while at least one or a plurality of the following conditions are satisfied when the power supply of the device is turned ON, when the cable set is connected, and when the initial setting start for the device is performed.

According to this configuration, such a configuration can be adopted that in accordance with the content of the set information and in accordance with the usability for the user, the set information is read while at least one or plurality of the following conditions are satisfied when the power supply of the device is turned ON, when the cable set is connected, and when the initial setting start for the device is performed.

In the above-mentioned network system, the set information preferably includes one or multiple pieces of information including the communication conditions including the communication speed, the presence or absence of the parity, and the data length, the interface type, the communication arrangement of the cable set, the control address of the device, the nickname of the device, the operation mode of the device, the encryption key, and the serial number inherit to the non-volatile memory.

According to this configuration, the device can perform the initial setting based on one or multiple pieces of information among the communication conditions including the communication speed, the presence or absence of the parity, and the data length, the interface type, the communication arrangement of the cable set, the control address of the device (IP address and the like), the nickname of the device (the domain name and the like), the operation mode of the device (in a case where device needs a selection of the operation modes), the encryption key, and the serial number inherit to the non-volatile memory.

In the above-mentioned network system, a part or the entire set information is preferably encrypted on the basis of the information associated with the part of the set information.

According to this configuration, the unauthorized read of the non-volatile memory can be prevented.

In the above-mentioned network system, the device preferably further includes set information storage means for storing the set information in a non-volatile manner, set information write means for writing the set information stored in the set information storage means in the non-volatile memory, and copy means for checking about the consistency between the set information stored in the set information storage means and the set information stored in the non-volatile memory by performing a communication between the cable set and the device. In a case where the consistency is not obtained, the set information stored in the set information storage means or the set information stored in the non-volatile memory is preferably copied to the other side by the copying means together with the set information read means and the set information write means while following the predetermined rule.

According to this configuration, the consistency on the set information stored in the non-volatile memory and the set information storage means of the device can be maintained. Also, in accordance with the "predetermined rule", the usability for performing the initial setting can be enhanced.

In the above-mentioned network system, the predetermined rule preferably includes a rule with which the copying is performed from the side where the set information is written to the side where the set information is not written.

According to this configuration, the cable set in which the set information is not written in the non-volatile memory is connected to the device and the set information of the device can be copied to the non-volatile memory. As a result, in a case where the device is replaced, by copying the copied set information to the new device (only in a case where the set information is not written in the new device) it is possible to transfer the set information set in the device before the replacement to the new device.

In the above-mentioned network system, the device preferably includes the output means for outputting the set information stored in the set information storage means and the non-volatile memory and the instruction obtaining means for obtaining the instruction from the user with respect to the output, and the predetermined rule preferably includes a rule of copying the information while following the instruction from the instruction obtaining means.

According to this configuration, due to the replacement of devices or the like, even in a case where the set information stored in the non-volatile memory is not matched with the set information stored in the device storage means, it is possible to rely on the user to determine which set information is to be matched with. Therefore, it is possible to use the device in which the set information is written in the set information storage means as a new device.

In the above-mentioned network system, the non-volatile memory is preferably composed of the RFID, the set information read means and the set information write means perform read and write of the set information through a wireless communication. Also, a part or all of the set information read means and the set information write means from the RFID are desirably used for reading and writing the user ID and the product ID in addition to read and write of the RFID for the set information of the network.

According to this configuration, it is unnecessary to use a communication line for reading and writing the non-volatile memory (RFID) within the cable set, and therefore a general purpose cable can be used.

In the above-mentioned network system, the RFID is preferably mounted to a cable name tag attached to the cable set.

According to this configuration, it is possible to easily mount (attach) the RFID to the cable set and at the same time the operator can easily check the information on the nickname of the device or the like which can be disclosed to the public.

In the above-mentioned network system, the device preferably includes the connecting port to which the cable set is connected. The cable set preferably includes the cable side read/write only communication line used for the read and write of the set information with respect to the non-volatile memory and the cable side normal use communication line used for another communication with the device. Also, it is preferable that the connecting port includes the device side read only communication line and the device side normal use communication line respectively connected to the cable side read/write only communication line and the cable side normal use communication line and the device side read/write only communication line, and in a case where the cable set provided with no cable side read/write only communication line is connected, the device side read/write only communication line is not functioned and only the device side normal use communication line is functioned.

According to this configuration, even in a case where the cable set to which no non-volatile memory is mounted, that is, the cable provided with no cable side read/write only communication line is connected, it is possible to perform the normal communication (communication other than read and write of the set information).

In the above-mentioned network system, a part or all of the communication lines provided to the cable set preferably double as the cable side read/write only communication line and the cable side normal use communication line.

According to this configuration, it is possible to reduce or eliminate the number of communication lines that should be added for the cable side read/write only communication line and the device side read/write only communication line.

In the above-mentioned network system, the cable side read/write only communication line is preferably composed of a single communication line in which the power supply line and the signal line are used in common.

According to this configuration, the number of communication lines for the cable side read/write only communication line and the device side read/write only communication line can be suppressed to one, or two in total together with the GND.

In the above-mentioned network system, the non-volatile memory is preferably mounted to the plug attached to the end on the device side of the cable set.

According to this configuration, the length of the cable side read/write only communication line can be shorten as much as possible, and still more the signal degradation can be suppressed. Also, as it suffices that the non-volatile memory is mounted on the plug, the mounting (attachment) can be easily performed.

In the above-mentioned network system, the plug is preferably the RJ45 type, and such a configuration is preferable that the one cable side read/write only communication line is respectively added at both ends of the eight cable side normal use communication lines.

According to this configuration, in the RJ45 type plug, by applying such a configuration to the present invention that two of the cable side read/write only communication lines in total are added to both the ends, the device according to the present invention having the connecting port which can be connected to the ten communication lines can connect both the normal cable having the eight communication lines and the cable set according to the present invention having the ten communication lines (the cable to which the non-volatile memory is mounted).

In the above-mentioned network system, the cable set is preferably composed of a general purpose cable and a conversion adapter having a plug for a connection with the device, a non-volatile memory, and a jack for a connection with the general purpose cable.

According to this configuration, by only connecting the conversion adapter to the general purpose cable, it is possible to compose the cable set applicable to the present invention easily and at an inexpensive cost.

In the above-mentioned network system, a hub provided with at least one port to which the other end of the cable set connected to the device is connected is preferably further provided, and instead of mounting the non-volatile memory to the cable set, it is preferably to mount the non-volatile memory for each port to the hub.

According to this configuration, by using the hub to which the non-volatile memory for each port is mounted, it becomes unnecessary to mount the non-volatile memory to the cable. Also, for each port, by determining the installation location of the connected device, even in a case where the set information is different for each installation location, the appropriate set information can be set.

In the above-mentioned network system, the hub preferably further includes a control CPU for controlling the respective non-volatile memories and a network controller for communication with a network device connected to the individual ports.

According to these configurations, by using the hub to which the non-volatile memory in which the set information for the device connected to each port is stored, the network controller for communicating with the network device connected to each port when the communication is established, and the control CPU for controlling them are mounted, it is possible to use the general purpose plug and cable.

A network system according to another present invention relates to a network system, including: a hub for a network to which a non-volatile memory is mounted; and a device connected to the hub, the network system being characterized in that: the hub includes: set information read means for reading set information used for performing an initial setting of a device connected to each port on the hub from the mounted non-volatile memory; and set information transmission means for performing a communication with the device based on the read set information and transmitting the read set information to the device; and the device includes: set information obtaining means for obtaining the set information transmitted by the set information transmission means; and initial setting means for performing an initial setting on the basis of the obtained set information.

According to this configuration, the device reads the set information for performing the initial setting of itself from the non-volatile memory mounted to the hub and it is possible to automatically perform the initial setting on the basis of the set information. That is, it is unnecessary to perform the operation for the initial setting by an operator, and thus the reduction of the maintenance cost for the network system can be achieved. Also, for each port, by determining the installation location of the connected device, even in a case where the set information is different for each installation location, the appropriate set information can be set. It should be noted that in a case where the device and the hub are connected via the cable, a general purpose cable can be used at the cable.

In the above-mentioned network system, the set information transmission means preferably transmits the set information by communicating with the device connected to each port of the hub when the communication between the hub and the device is started on the one to one connection.

According to this configuration, the communication is performed with the device connected to each port of the hub on the one to one connection, and thus the control is facilitated.

In the above-mentioned network system, the set information preferably includes one or multiple pieces of information among the communication conditions including the communication speed, the presence or absence of the parity, and the data length, the interface type, the control address of the device, the nickname of the device, the operation mode of the device, the encryption key, and the serial number inherit to the non-volatile memory.

According to this configuration, the device can perform the initial setting based on one or multiple pieces of information among the communication conditions including the communication speed, the presence or absence of the parity, and the data length, the interface type, the control address of the device (the IP address and the like), the nickname of the device (the domain name and the like), the operation mode of the device (in a case where device needs a selection of the operation modes), the encryption key, the serial number inherit to the non-volatile memory.

In the above-mentioned network system, a part or entire set information is preferably encrypted on the basis of the information associated with a part of the set information.

According to this configuration, the unauthorized read of the non-volatile memory can be prevented.

In the above-mentioned network system, the device preferably further includes set information storage means for storing the set information in a non-volatile manner, set information write means for writing the set information stored in the set information storage means to the non-volatile memory mounted to the hub, and copy means for checking about the consistency between the set information stored in the set information storage means and the set information stored in the non-volatile memory by performing a communication between the hub and the device, and in a case where the consistency is not obtained, copying the set information stored in the set information storage means or the set information stored in the non-volatile memory to the other side together with the set information read means and the set information write means while following the predetermined rule.

According to this configuration, the consistency between the set information stored in the non-volatile memory and the set information stored in the set information storage means can be maintained. Also, in accordance with the "predetermined rule", the usability for performing the initial setting can be enhanced.

In the above-mentioned network system, the predetermined rule preferably includes a rule with which the copying is performed from the side where the set information is written to the side where the set information is not written.

According to this configuration, by connecting the hub in which the set information is not written in the non-volatile memory to the device, it is possible to copy the set information of the device to the non-volatile memory. As a result, in a case where the device is replaced, by copying the copied set information from the hub to a new device (only in a case where the set information is not written in the new device), it is possible to transfer the set information set in the device before the replacement to the new device.

In the above-mentioned network system, the device preferably includes the output means for outputting the set information stored in the set information storage means and the non-volatile memory and the instruction obtaining means for obtaining the instruction from the user with respect to the output, and the predetermined rule preferably includes a rule of copying the information while following the instruction from the instruction obtaining means.

According to this configuration, due to the replacement of devices or the like, even in a case where the set information stored in the non-volatile memory is not matched with the set information stored in the storage means of the device, it is possible to rely on the user to determine which set information is to be matched with. Therefore, even the device in which the set information is written in the set information storage means can be used as a new device.

In the above-mentioned network system, it is preferable that the device includes the connecting port to which the cable set is connected, the cable set includes the RFID and the cable side normal use communication line used for performing a communication other than read and write of the set information with the device, and also the connecting port includes the RFID read/write apparatus and the device side normal use communication line respectively connected to the RFID and the cable side normal use communication line, and in a case where the cable set provided with no RFID is connected, the RFID read/write apparatus does not function, and only the device side normal use communication line functions.

According to this configuration, in a case where the cable set provided with no RFID is connected, it is possible to perform the normal communication (communication other than the read and write of the set information).

In the above-mentioned network system, a part or all of the RFID read/write apparatuses preferably double as the RFID read/write apparatus for an authentication of the user ID or the product ID.

According to this configuration, the RFID read/write apparatus can be used for purposes other than the read and write of the non-volatile memory.

A communication system according to the present invention relates to a communication system, including: a device; and an RFID tag which is affixed at an installation location of the device and stores set information used for performing an initial setting of the device, the network system being characterized in that the device includes: set information read means for reading the set information from the RFID tag via a wireless communication; and initial setting means for performing an initial setting on the basis of the read set information.

Also, a control method for a communication system which includes: a device; and an RFID tag which is affixed at an installation location of the device and stores set information used for performing an initial setting of the device, the control method being characterized by including instructing the device to execute: a step of reading the set information from the RFID via a wireless communication; and a step of performing an initial setting on the basis of the read set information.

According to these configurations, the set information is read from the RFID tag affixed to the installation location of the device, and the initial setting can be automatically performed on the basis of the set information. That is, it is unnecessary to perform the operation for the initial setting by an operator, and thus the reduction of the maintenance cost for the network system can be achieved. Also, even in a case where the set information is different for each installation location, the appropriate set information can be set. Furthermore, the simple configuration of the device only having a wireless communication function and the RFID tag may be used, and therefore the system can be constructed at an inexpensive cost.

The interface apparatus according to the present invention functions as a device in the network system according to any one of the above-mentioned items or the above-mentioned communication system and is characterized by being detachably attached to an electronic equipment.

According to this configuration, without adding a change to the electronic equipment, it is possible to construct the network system or the communication system according to the present invention.

The cable set according to the present invention is characterized by being used in the network system described in any one of the above-mentioned items.

The plug according to the present invention is characterized by being used in the above-mentioned network system.

The communication line holding plate according to the present invention is characterized by being used in the above-mentioned plug and to which the non-volatile memory is mounted, and also holding the cable side read/write only communication line and the cable side normal use communication line.

The program according to the present invention is characterized by instructing the computer to execute the respective steps in the control method for the above-mentioned network system or the control method for the above-mentioned communication system.

By using these, it is possible to construct the network system according to the present invention in which the initial setting can be automatically performed.

In addition, the network system according to the present invention is applied to the power supply feed system so that the following configuration can also be adopted.

A power supply feed system according to the present invention relates to a power supply system, including: a cable set to which a non-volatile memory is mounted; a first device which requires a power supply via the cable set; and a second device for performing the power supply via the cable set to the first device, the network system being characterized in that: the non-volatile memory stores power supply information related to a power supply request from the first device; and the second device includes: power supply information read means for reading the power supply information from the non-volatile memory of the connected cable set; power supply determination means for determining whether the power supply can be performed or not based on the read power supply information; and power supply control means for permitting the power supply to the first device in a case where the power supply determination means determines that the power supply can be performed.

Also, a control method for the power supply feed system relates to a control method for a network system which includes: a cable set to which a non-volatile memory is mounted; a first device which requires a power supply via the cable set; and a second device for performing the power supply via the cable set to the first device, the non-volatile memory storing power supply information related to a power supply request from the first device, the control method being characterized by including instructing the second device to execute: a step of reading the power supply information from the non-volatile memory of the connected cable set; a step of determining whether the power supply can be performed or not based on the read power supply information; and a step of permitting the power supply to the first device in a case where it is determined that the power supply can be performed.

According to these configurations, the second device reads the power supply information related to the power supply request from the first device from the non-volatile memory, and in a case where it is determined that the power supply can be performed on the basis of the power supply information, that is, in a case where the power supply request on the side receiving the power supply feed is matched with the power supply output capability on the side supplying the power, the power supply feed is permitted. Thus, the appropriate power supply feed can be performed. As a result, it is possible to prevent the overload, the breakdown of the fuse, the erroneous operation, or the like due to an inappropriate power supply feed in advance.

In the above-mentioned power supply feed system, the cable set preferably includes, in addition to a power supply line for performing the power supply feed, a signal line for performing a communication between the first device and the second device.

According to this configuration, the present invention can be applied not only in a case where the cable set is the power supply cable, but also in a case where the cable set is a communication cable (a LAN cable or the like).

In the above-mentioned power supply feed system, the power supply feed determination means preferably determines that the power supply feed is impossible in a case where the power supply information read means cannot perform the read of the power supply information.

According to this configuration, in a case where the devices are connected via a cable to which no non-volatile memory is mounted or the like, if the read of the power supply information cannot be performed, by determining that the power supply feed is impossible, it is possible to certainly prevent an inappropriate incident due to an inappropriate power supply feed.

In the above-mentioned power supply feed system, the power supply feed control means preferably performs the error notification and also prohibits the power supply feed to the first device in a case where it is determined by the power supply feed determination means that the power supply feed is impossible.

According to this configuration, it is possible to notify the user that the power supply feed is impossible through the error notification.

In the above-mentioned power supply feed system, the power supply information preferably includes one or multiple pieces of information among the interface type, the consumed current, the consumed power, the arrangement of the power supply line included in the communication line, the encryption key, and the serial number inherit to the non-volatile memory.

According to this configuration, on the basis of the one or multiple pieces of information among the interface type, the consumed current, the consumed power, the arrangement of the power supply line included in the communication line, the encryption key, the serial number inherit to the non-volatile memory, it is possible to determine whether the power supply feed is possible or not.

In the above-mentioned power supply feed system, it is preferable that the non-volatile memory further stores the circuit information related to the circuit configuration of the first device, the second device further includes circuit information read means for reading the circuit information from the non-volatile memory of the connected cable set, communication determination means for determining whether a communication with the first device is possible or not on the basis of the read circuit information, and communication control means for permitting the communication with the first device in a case where it is determined by the communication determination means that the communication is possible.

According to this configuration, the second device reads the circuit information related to the circuit configuration of the first device from the non-volatile memory, and on the basis of the circuit information, the communication is permitted in a case where it is determined that the communication is possible. Thus, it is possible to perform the appropriate communication connection. As a result, it is possible to prevent an erroneous or the like due to an appropriate communication connection in advance.

In the above-mentioned power supply feed system, the communication control means preferably performs the error notification and/or does not output a part or all of the signals in a case where the communication determination means determines that the communication is impossible.

According to this configuration, by way of the error notification, it is possible to notify the user that the appropriate communication connection is not established, and also it is possible to prevent an output of a signal with which an inappropriate incident may be generated.

In the above-mentioned power supply feed system, the circuit information preferably includes one or multiple pieces of information among the communication conditions including the communication speed, the presence or absence of the parity, and the data length, the encryption key, and the serial number inherit to the non-volatile memory.

According to this configuration, on the basis of the one or multiple pieces of information among the communication conditions including the communication speed, the presence or absence of the parity, and the data length, the encryption key, the serial number inherit to the non-volatile memory, it is possible to determine whether the communication can be performed or not.

In the above-mentioned power supply feed system, the non-volatile memory is preferably composed of the RFID, the power supply information read means and the circuit information read means preferably performs the read of information via a wireless communication.

According to this configuration, it is unnecessary to use a communication line for reading and writing the non-volatile memory (RFID) within the cable set, and therefore a general purpose cable can be used within the cable set.

In the above-mentioned power supply feed system, the RFID is preferably mounted to the cable name tag attached to the cable set.

According to this configuration, it is possible to easily mount (attach) the RFID to the cable set.

In the above-mentioned power supply feed system, it is preferable that the second device includes the connecting port to which the cable set is connected, the cable set includes the cable side read only communication line used for reading information with respect to the non-volatile memory and the second cable side normal use communication line used for establishing another communication with the device, the connecting port includes the device side read only communication line and the device side normal use communication line respectively connected to the cable side read only communication line and the cable side normal use communication line, and also a part or all of the communication lines provided to the cable set double as the cable side read only communication line and the cable side normal use communication line.

According to this configuration, it is possible to reduce or eliminate the number of communication lines that should be added for the cable side read only communication line and the device side read only communication line used for reading the power supply information and the circuit information.

In the above-mentioned power supply feed system, the cable side read only communication line is preferably composed of a single communication line in which the power supply line and the signal line are used in common.

According to this configuration, the number of communication lines for the cable side read only communication line and the device side read only communication line can be suppressed to one, or two in total together with the GND.

In the above-mentioned power supply feed system, the non-volatile memory is preferably mounted to the plug attached at the end on the second device of the cable set.

According to this configuration, it is possible to shorten the length of the cable side read only communication line as much as possible, and still more the signal degradation can be suppressed. Also, as it suffices that the non-volatile memory is mounted on the plug, the mounting (attachment) can be easily performed.

In the above-mentioned power supply feed system, the plug is preferably the RJ45 type, and such a configuration is preferably adopted that the single cable side read only communication line is added to be arranged on both the sides of the eight cable side normal use communication lines.

According to this configuration, in the RJ45 type plug, by applying the configuration of adding the two cable side read only communication lines to both the ends to the present invention, the device can connect both the normal cable having the eight communication lines and the cable set having the ten communication lines (the cable to which the non-volatile memory is mounted) for the present invention.

The interface apparatus according to the present invention is characterized by functioning as the device in the power supply feed system described in any one of the above-mentioned items and also can be detachably attached to an electronic equipment.

According to this configuration, without adding a change to the electronic equipment, it is possible to construct the power supply feed system according to the present invention.

The cable set according to the present invention is characterized by being used in the power supply feed system described in any one of the above-mentioned items.

The plug according to the present invention is characterized by being used in the above-mentioned power supply feed system.

The program according to the present invention is characterized by instructing a computer to execute the respective steps in the control method for the above-mentioned power supply feed system.

By using these, it is possible to construct the power supply feed system according to the present invention in which the appropriate power supply feed can be performed between the two device on the side performing the power supply feed and on the side receiving the power supply feed.

In addition, it is also possible to attain the following configuration by adding a network relay apparatus to the network system according to the present invention.

The network system according to the present invention relates to a network system, including: a cable set to which a non-volatile memory is mounted; a network relay apparatus in which an address filter can be set and to which the cable set is connected; and a device connected to another end of the cable set different from an end to which the network relay apparatus is connected, the network system being characterized in that: the non-volatile memory stores a cable address which is a unique hardware address allocated to each cable set and the cable address is registered in the network relay apparatus; and the device includes: address read means for reading the cable address from the non-volatile memory of the connected cable set; address storage means for storing the read cable address; and address switch means for switching a hardware address of itself to the cable address stored in the address storage means.

Also, the control method for the network system according to the present invention relates to a control method for a network system which includes: a cable set to which a non-volatile memory is mounted; a network relay apparatus in which an address filter can be set and to which the cable set is connected; and a device connected to another end of the cable set different from an end to which the network relay apparatus is connected, the non-volatile memory storing a cable address which is a unique hardware address allocated to each cable set and the cable address being registered in the network relay apparatus, the control method including instructing the device to execute: a step of reading the cable address from the non-volatile memory of the connected cable set; and a step of switching a hardware address of itself to the read cable address.

According to these configurations, as the device reads the cable address from the non-volatile memory of the connected cable set (the cable provided with the non-volatile memory) and switches the hardware address of itself to the read cable address, even in a case where the device is replaced, by connecting the cable set to a new device, it is possible to perform the operation without paying attention to the address filter of the network relay apparatus. That is, the new device functions as the cable address of the connected cable set irrespective of the hardware address of itself, and therefore while the security due to the address filter of the network relay apparatus is maintained, it is possible to omit the labor such the registration or the change of the hardware address of the new device.

In the above-mentioned network system, in a case where the cable set to which the non-volatile memory is mounted is not connected, the device preferably functions as the hardware address of itself instead of the cable address.

According to this configuration, even in a case of being connected via the general purpose cable to which the non-volatile memory is not mounted, that is, even in a case of not being connected to the network system of the present invention, the device can function as the hardware address of itself without any hindrance.

In the above-mentioned network system, the non-volatile memory preferably further stores setting information for performing the initial setting for the device, the address read means preferably reads the set information together with the cable address, and the device preferably further includes initial setting means for performing an initial setting on the basis of the read set information.

According to this configuration, the set information for performing the initial setting of itself is read from the non-volatile memory mounted to the connected cable set, and thus it is possible to automatically perform the initial setting on the basis of the set information. That is, it is unnecessary to perform the operation for the initial setting by an operator, and thus the reduction of the maintenance cost for the network system can be achieved.

In the above-mentioned network system, the non-volatile memory is composed of the RFID, and the address read means preferably performs the read of information via a wireless communication.

According to this configuration, it is unnecessary to use a communication line for reading and writing the non-volatile memory (RFID) within the cable set, and therefore a general purpose cable can be used within the cable set.

In the above-mentioned network system, the RFID is preferably mounted to the cable name tag attached to the cable set.

According to this configuration, it is possible to easily mount (attach) the RFID to the cable set.

In the above-mentioned network system, it is preferable that the device includes the connecting port to which the cable set is connected, the cable set includes the cable side read only communication line used for reading information with respect to the non-volatile memory, and the cable side normal use communication line used for another communication with the device, the connecting port includes the device side read only communication line and the device side normal use communication line respectively connected to the cable side read only communication line and the cable side normal use communication line, and in a case where the cable set provided with no cable side read only communication line is connected, the device side read only communication line does not function and only the device side normal use communication line functions.

According to this configuration, even in a case where the cable set to which no non-volatile memory is mounted, that is, the cable provided with no cable side read only communication line is connected, it is possible to perform a normal communication (a communication other than the read of the cable address or the set information).

In the above-mentioned network system, a part or all of the communication lines provided to the cable set preferably double as the cable side read only communication line and the cable side normal use communication line.

According to this configuration, it is possible to reduce or eliminate the number of communication lines that should be added for the cable side read only communication line and the device side read only communication line.

In the above-mentioned network system, the cable side read only communication line is preferably composed of a single communication line in which the power supply line and the signal line are used in common.

According to this configuration, the number of communication lines for the cable side read only communication line and the device side read only communication line can be suppressed to one, or two in total together with the GND.

In the above-mentioned network system, the non-volatile memory is preferably mounted to the plug attached to the end on the device side of the cable set.

According to this configuration, it is possible to shorten the length of the cable side read only communication line as much as possible, and still more the signal degradation can be suppressed. Also, as it suffices that the non-volatile memory is mounted on the plug, the mounting (attachment) can be easily performed.

In the above-mentioned network system, the plug is preferably the RJ45 type, and such a configuration is preferably adopted that the single cable side read only communication line is added to be arranged on both the sides of the eight cable side normal use communication lines.

According to this configuration, in the RJ45 type plug, by applying the configuration of adding the two cable side read only communication lines to both the ends to the present invention, the device can connect both the normal cable having the eight communication lines and the cable set having the ten communication lines (the cable to which the non-volatile memory is mounted) for the present invention.

In the above-mentioned network system, the cable set is preferably composed of a general purpose cable and a conversion adapter having a plug for a connection with the device, a non-volatile memory, and a jack for a connection with the general purpose cable.

According to this configuration, by simply connecting the conversion adapter to the general purpose cable, it is possible to compose the cable set applicable to the present invention easily and at an inexpensive cost.

In the above-mentioned network system, the network relay apparatus preferably includes at least one port connected to the cable set, and instead of mounting the non-volatile memory to the cable set, the non-volatile memory for each port is preferably mounted to the network relay apparatus.

According to this configuration, by mounting the non-volatile memory for each port to the network relay apparatus, it becomes unnecessary to mount the non-volatile memory to the cable.

In the above-mentioned network system, the device and the network relay apparatus are preferably connected via a wireless communication instead of the cable set.

According to this configuration, it is possible to increase the degree of freedom in the arrangement of the device and the network relay apparatus.

In the above-mentioned network system, the control CPU for controlling the respective non-volatile memories and the network controller for communication with the network device connected to the individual ports are preferably further mounted to the network relay apparatus.

According to these configurations, by mounting the non-volatile memory in which the port address is saved in each port, the network controller for performing the communication with the network device connected to each port when the communication is established, and the control CPU for controlling those, it is possible to use the general purpose plug and cable.

Another network system according to the present invention relates to a network system, including: a network relay apparatus in which an address filter can be set and a non-volatile memory is mounted for each port; and a device connected to the network relay apparatus via the port, the network system being characterized in that: the non-volatile memory stores a port address which is a unique hardware address allocated to each port and the port address is registered in the network relay apparatus; the network relay apparatus includes: address read means for reading the port address from the mounted non-volatile memory; and address transmission means for performing a communication with the device and transmitting the read port address to the device; and the device includes: address obtaining means for obtaining the port address transmitted by address transmission means; address storage means for storing the obtained port address; and address switch means for switching a hardware address of itself to the port address stored in the address storage means.

According to these configurations, as the device reads the port address from the non-volatile memory for each port mounted to the network relay apparatus and switches the hardware address of itself to the read port address, even in a case where the device is replaced, by connecting the cable set to a new device, it is possible to perform the operation without paying attention to the address filter of the network relay apparatus. That is, the new device functions as the port address of the connected port irrespective of the hardware address of itself, and therefore while the security due to the address filter of the network relay apparatus is maintained, it is possible to omit the labor such the registration or the change of the hardware address of the new device.

In the above-mentioned network system, the address transmission means preferably transmits the port address by communicating with the device connected to each port of the hub when the communication between the hub and the device is started on the one to one connection.

According to this configuration, the communication is performed with the device connected to each port of the network relay apparatus on the one to one connection, the control is facilitated.

In the above-mentioned network system, in a case of being connected to the network relay apparatus to which the non-volatile memory is not mounted, the device preferably functions as the hardware address of itself instead of the port address.

According to this configuration, even in a case of being connected via the network relay apparatus to which the non-volatile memory is not mounted, that is, even in a case of not being connected to the network system of the present invention, the device can function as the hardware address of itself without any hindrance.

In the above-mentioned network system, it is preferably that the non-volatile memory further stores setting information for performing the initial setting for the device, the address read means reads the port address together with the set information, the address transmission means transmits the port address together with the set information, the address obtaining means obtains the transmitted set information, and the device further includes initial setting means for performing an initial setting on the basis of the thus obtained set information.

According to this configuration, by reading the set information for performing the initial setting of itself from the non-volatile memory of the connected port, it is possible to automatically perform the initial setting on the basis of the set information. That is, it is unnecessary to perform the operation for the initial setting by an operator, and thus the suppression of the maintenance cost for the network system can be achieved.

In the above-mentioned network system, it is preferable that the device includes the connecting port to which the cable set is connected, the cable set includes the RFID and the cable side normal use communication line used for the communication other than the read of information with the device, the connecting port includes the RFID read/write apparatus and the device side normal use communication line respectively connected to the RFID and the cable side normal use communication line, and in a case where the cable set provided with no RFID is connected, the RFID read/write apparatus does not function and only the device side normal use communication line functions.

According to this configuration, in a case where the cable set to which no RFID is mounted is connected, it is possible to perform the normal communication (the communication other than the read of the cable address and the set information).

In the above-mentioned network system, a part or all of the RFID read/write apparatuses preferably double as the RFID read/write apparatuses for the user ID or product ID authentication.

According to this configuration, the RFID read/write apparatus can be used for other purposes other than the non-volatile memory.

The communication system according to the present invention relates to a communication system, including: a device connected to a network together with a network relay apparatus in which an address filter can be set and a hardware address is registered; and an RFID tag which is affixed at an installation location of the device and stores the hardware address, the network system being characterized in that the device includes: address read means for reading the hardware address from the RFID tag via a wireless communication; address storage means for storing the read hardware address; and address switch means for switching a hardware address of itself to the hardware address stored in the address storage means.

Also, the control method for a communication system according to the present invention relates to a control method for a communication system which includes: a network relay apparatus in which an address filter can be set and a non-volatile memory is mounted for each port; and a device connected to the network relay apparatus via the port, the non-volatile memory storing a port address which is a unique hardware address allocated to each port and the port address being registered in the network relay apparatus, the control method being characterized by including: instructing the network relay apparatus to execute: a step of reading the port address from the mounted non-volatile memory; and a step of performing a communication with the device and transmitting the read port address to the device; and instructing the device to execute: a step of obtaining the transmitted port address; a step of storing the obtained port address; and a step of switching a hardware address of itself to the stored port address.

According to these configurations, the device reads the unique hardware address from the RFID tag affixed at the installation location of itself and switches the hardware address of itself to the read hardware address. Therefore, even in a case where the device is replaced, it is possible to omit the labor such as the registration or the change of the hardware address of the new device in the network relay apparatus. Also, as the general purpose cable can be used for connecting the network relay apparatus to the device and the network relay apparatus, it is possible to construct the system at an inexpensive cost.

The interface apparatus according to the present invention is characterized by functioning as the device in the network system described in any one of the above-mentioned items or the above-mentioned communication system and also being detachably attached to an electronic equipment.

According to this configuration, without adding a change to the electronic equipment, it is possible to construct the present invention (the network system or the communication system).

The cable set according to the present invention is characterized by being used in the network system described in any one of the above-mentioned items.

The plug according to the present invention is characterized by being used in the above-mentioned network system.

The communication line holding plate according to the present invention is characterized by being used in the above-mentioned plug to which the non-volatile memory is mounted, and also holding the cable side read only communication line and the cable side normal use communication line.

The program according to the present invention is characterized by instructing a computer to execute the respective steps in the control method for the above-mentioned network system or the above-mentioned communication system.

By using these, in a case where the device connected to the network is replaced, the network system of the present invention can be constructed in which it is possible to omit the registration or change of the hardware address of the new device in the network relay apparatus where the address filter also connected to the network can be set.

In addition, by applying the device in the network system of the present invention to the printer, the following configuration can also be adopted.

The printer network system according to the present invention relates to a printer network system for operating a plurality of printers in a plurality of locations, the network system being characterized by including: print information which is arranged at a location where the printer is used and stores location information for identifying the location as printed information; a printer provided with location information read means for reading the location information stored in the print information; and means for associating the read location information with a network address and assigning the associated network address to the printer which has read the location information.

According to this configuration, location information for identifying the location is determined for a location where the printer is arranged, and the location information is assigned to the corresponding location. Then, the printer arranged at the location reads the location information to obtain the location information, and it is possible to obtain the network address on the basis of the location information. If this network address is associated with the corresponding POS register, the printer which has obtained this network address can be operated in cooperation with the POS register. In this manner, by simply associating the printer with the recording means of the location information for the arrangement, the printer obtains the network address, and a state in which a communication can be established is attained. Therefore, even those having no knowledge of the setting for the network address can easily replace the printers.

BRIEF DESCRIPTION OF THE DRAWINGS

FIGS. 4A and 4B are enlarged plan views showing around a communication line holding plate inside a plug.

BEST MODE FOR CARRYING OUT THE INVENTION

Hereinafter, a network system, a cable set, a control method for the network system, and a program according to an embodiment of the present invention will be described in detail with reference to the attached drawings. The present invention has such a configuration that a device which needs an initial setting reads set information for performing the initial setting of itself from a non-volatile memory which exists outside of the device (mounted at a cable connected to the device or an installation location of the device), and the initial setting can be automatically performed on the basis of the set information. In view of the above, the network system and the like according to the present invention will be described below by way of examples where the network system is applied to a POS system used in a shop such as a supermarket or a convenience store.

Figure 1:
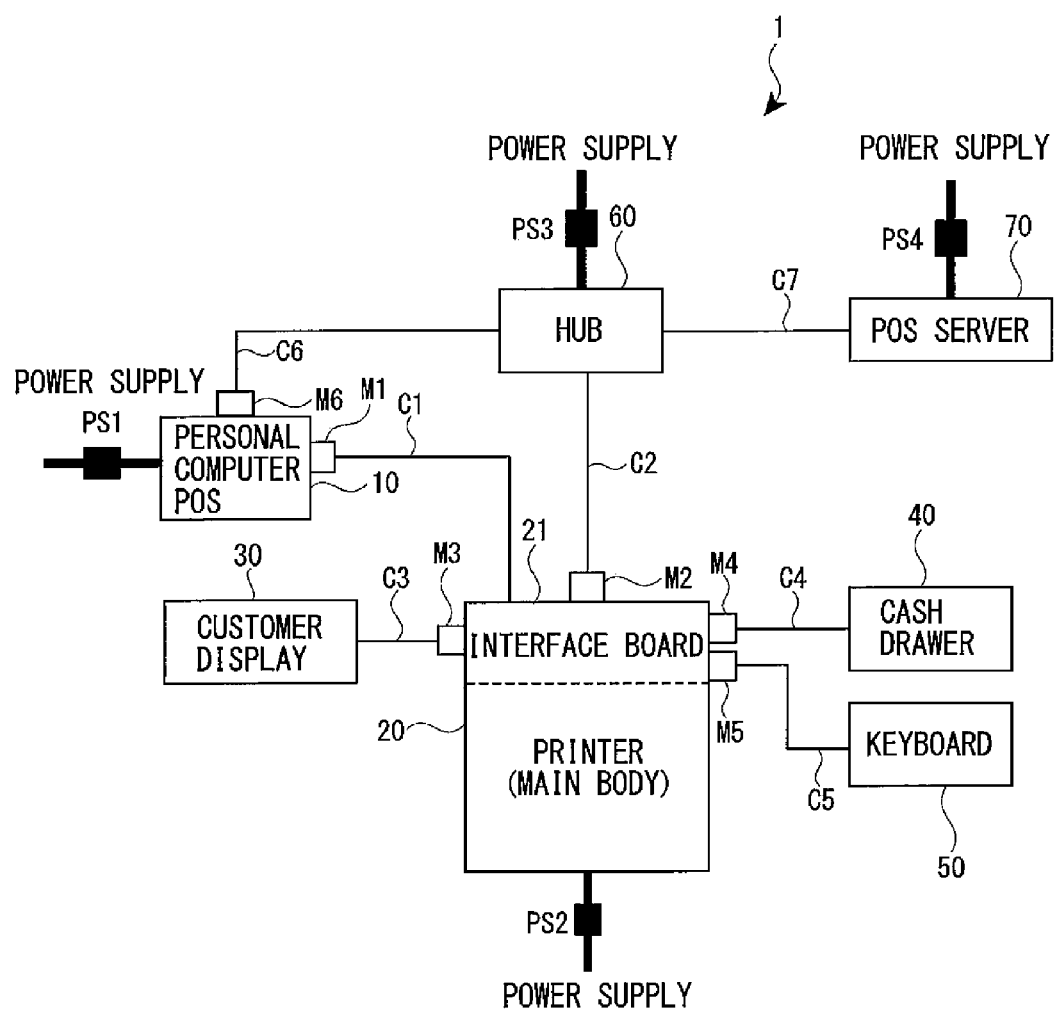
FIG. 1 is a system configuration diagram of a POS system according to an embodiment of the present invention.

FIG. 1 is a system configuration diagram of a POS system 1 according to an embodiment of the present invention. As shown in FIG. 1, the POS system 1 includes a personal computer POS 10 for performing a settlement of payment and a control on peripheral devices, a printer 20 for performing a print of a receipt and/or a voucher, a customer display 30 for displaying an amount of money to a customer, a cash drawer 40 for accommodating cash, a keyboard 50 for inputting a product code, an amount of money, and the like, a hub 60 to which a plurality of personal computer POSs 10 (only one personal computer POS is shown in FIG. 1) and a plurality of printers 20 (only one printer is shown in FIG. 1), and a POS server 70 for controlling the above-mentioned terminals connected via the hub 60 in a generalization manner.

Also, various modes are conceivable for a power supply feed mode to the respective devices. In the example of FIG. 1, the power supply feed is performed via the power supplies PS1, PS2, PS3, and PS4 to the personal computer POS 10, the printer 20, the hub 60, and the POS server 70. The power supply feed is performed to the customer display 30, the cash drawer 40, and the keyboard 50 from the printer 20 via cable sets C3, C4, and C5 (a LAN cable provided with a non-volatile memory module).

An interface board 21 (refer to FIG. 2) having a plurality of interfaces (connecting ports) is detachably attached to the printer 20. Through the replacement of the interface board 21, it is possible to easily expand various functions at a low cost. Also, the customer display 30, the cash drawer 40, and the keyboard 50 mentioned above are connected one another via the interface board 21.

Figure 2:
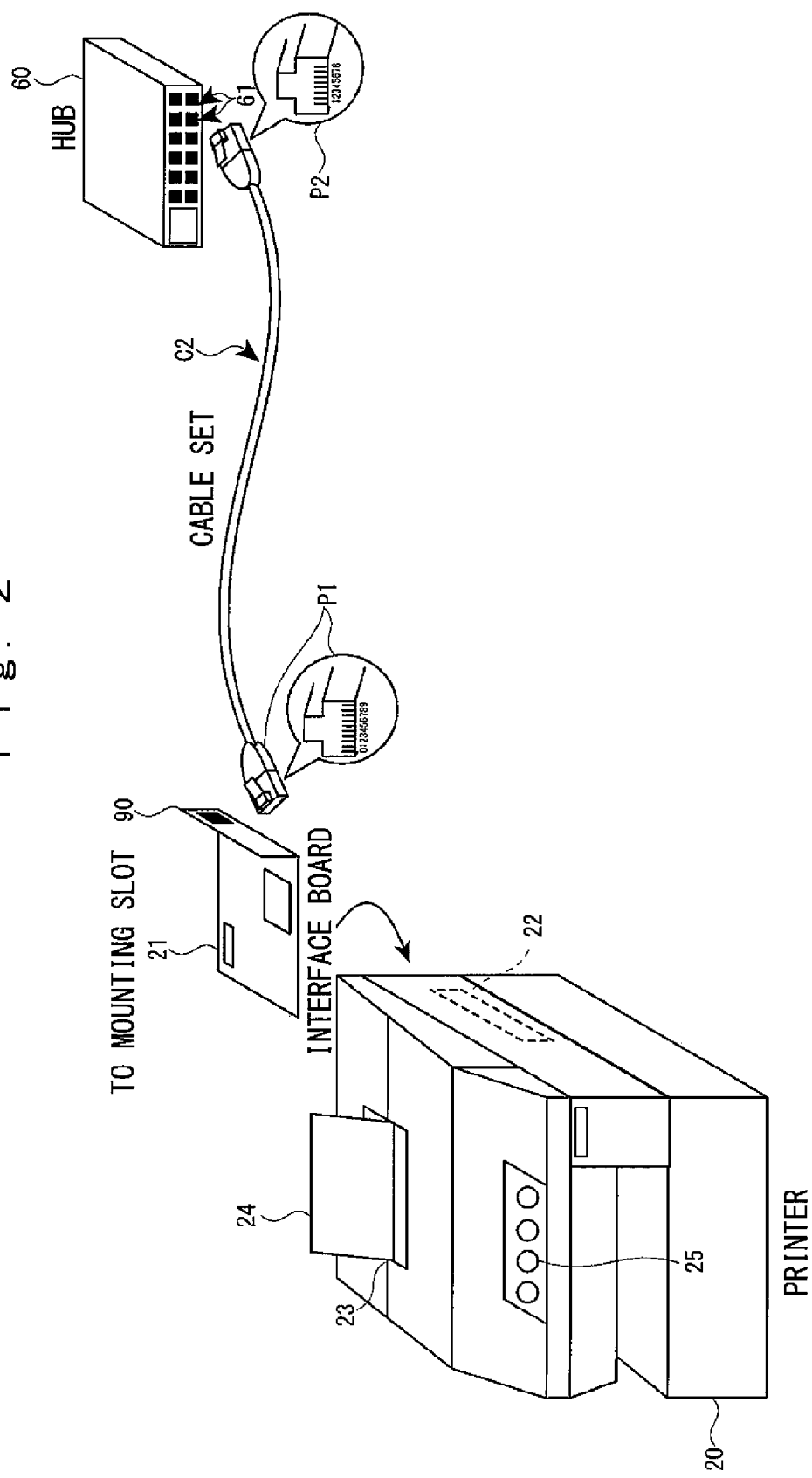
FIG. 2 is a perspective external view of a printer and a cable set.

Non-volatile memory modules M1 to M6 storing various pieces of information are mounted to plugs P of cable sets C1 to C6 for connecting the respective devices (refer to FIG. 2). The information stored in the non-volatile memory module M and a use method therefor will be described in detail in each embodiment. First, according to the first embodiment, an initial setting method for a device using the non-volatile memory module M will be described. Any type of the device which perform the initial setting may be employed, but a description will be given by way of an example of an initial setting method for the printer 20 using the cable set C2 (a network system 101, refer to FIG. 5).

FIG. 2 is a perspective external view of the printer 20 (main body), the interface board 21, and the cable set C2. As shown in FIG. 2, the printer 20 is provided with a mounting slot 22 for mounting the interface board 21 at its back face part and also a discharge port 23 for discharging the receipt or the voucher at its upper surface part (hereinafter referred to as "printed matter 24"). Furthermore, operation buttons 25 for performing various operations such as a power supply button are arranged on a front side of the upper surface part. Also, the interface board 21 is provided with a connecting port 90 to which a plug P1 of the cable set C2 is inserted (a connector 91, refer to FIG. 6) which will be described later.

The cable set C2 has the plugs P1 and P2 (modular connector) of the RJ45 type at both ends. The plug P1 on the printer side has ten pins, and the plug P2 on the hub side has eight pins. In usual cases, as the plug of the RJ45 type has eight pins, it is possible to use a general purpose plug for the plug P2 on the hub. On the other hand, the plug P1 on the printer side has a configuration in which one pin (communication line) is added (further arranged) to both ends of the eight pins in this general purpose plug. With use of the two pins, read and write are performed with respect to the non-volatile memory module M.

Figure 3:
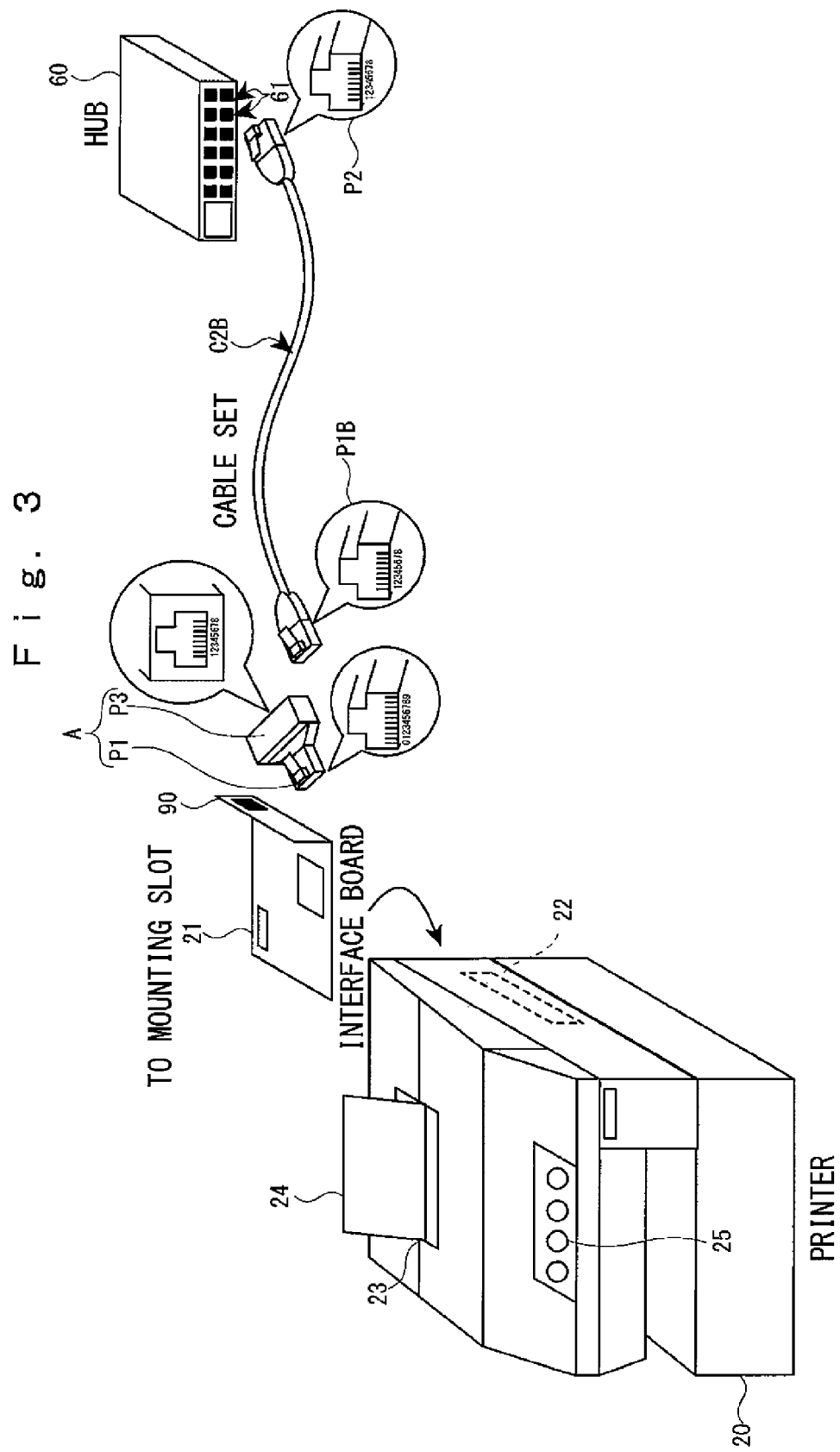
FIG. 3 is a perspective external view of the printer, a conversion adapter, and the cable.

FIG. 3 illustrates a configuration in which instead of the cable set C2 shown in FIG. 2, the non-volatile memory module M (not shown in the drawing), a conversion adaptor A having the ten pin plug P1 and an eight pin jack P3, and a general purpose cable C2B having an eight pin plug P1B and an eight pin plug P2 provided at both ends are provided. On the other hand, the plug P1 of the conversion adaptor A has a configuration in which one pin (communication line) is provided at both ends in the eight pins in this general purpose plug P1B are added (further arranged). With use of the two pins, the read and write with respect to the non-volatile memory module M are performed. On the other hand, a general purpose jack used in the hub 60 can be used for the eight pin jack P3 on the general purpose cable side of the conversion adaptor A.

FIGS. 4A and 4B is an enlarged plan view around a communication line holding plate 81 inside the ten pin plug P1 shown in FIGS. 2 and 3. FIG. 4A illustrates a back surface of the communication line holding plate 81 viewed from the top of the plug P1 (pin arrangement surface side), and FIG. 4B illustrates a front surface of the communication line holding plate 81 viewed from the bottom side of the plug P1 (on a side of a surface provided with an engagement fitting). Also, in FIGS. 4A and 4B, an arrow shown in the drawing (left-hand side) indicates an inserting direction to the device (the printer 20). Therefore, the right-hand side in the drawing corresponds to the cable connection side.

As shown in FIGS. 4A and 4B, in the plug P1, the ten pin communication line 80 with pin numbers 0 to 9 is held on the back surface of the communication line holding plate 81. Among them, eight pins of the pin numbers 1 to 8 form cable side normal use communication lines 83 used for a communication between the devices, and two pins of the pin numbers 0 and 9 at both the ends form cable side read/write only communication lines 82a and 82b used for read and write with respect to a non-volatile memory 122 (refer to FIG. 9). Also, the non-volatile memory module M in which the above-mentioned non-volatile memory 122 is put into a module is held on the front surface.

The cable side read only communication lines 82a and 82b penetrates from the back surface of the communication line holding plate 81 through the communication line holding plate 81 to be taken out from the front surface side and is connected with lead frames 85 formed at both ends of the non-volatile memory module M through a soldering. Therefore, the cable connections are established on the eight cable side normal use communication lines 83 of the pin numbers 1 to 8.

As described above, the ten pin plug P1 according to the present invention is manufactured by molding with a resin the ten pin communication line 80 and the entire communication line holding plate 81 to which the non-volatile memory module M is attached. In this manner, the non-volatile memory module M is held in the communication line holding plate 81 within the plug P1. Thus, it is possible to easily mount the non-volatile memory module M, and also shorten the cable side read/write only communication lines 82a and 82b. Still more, the signal degradation can be suppressed. It should be noted that it is naturally possible to take out and directly connect the lead of the non-volatile memory module M to the pin of the plug P1 instead of the communication lines 82a and 82b.

Figure 5:
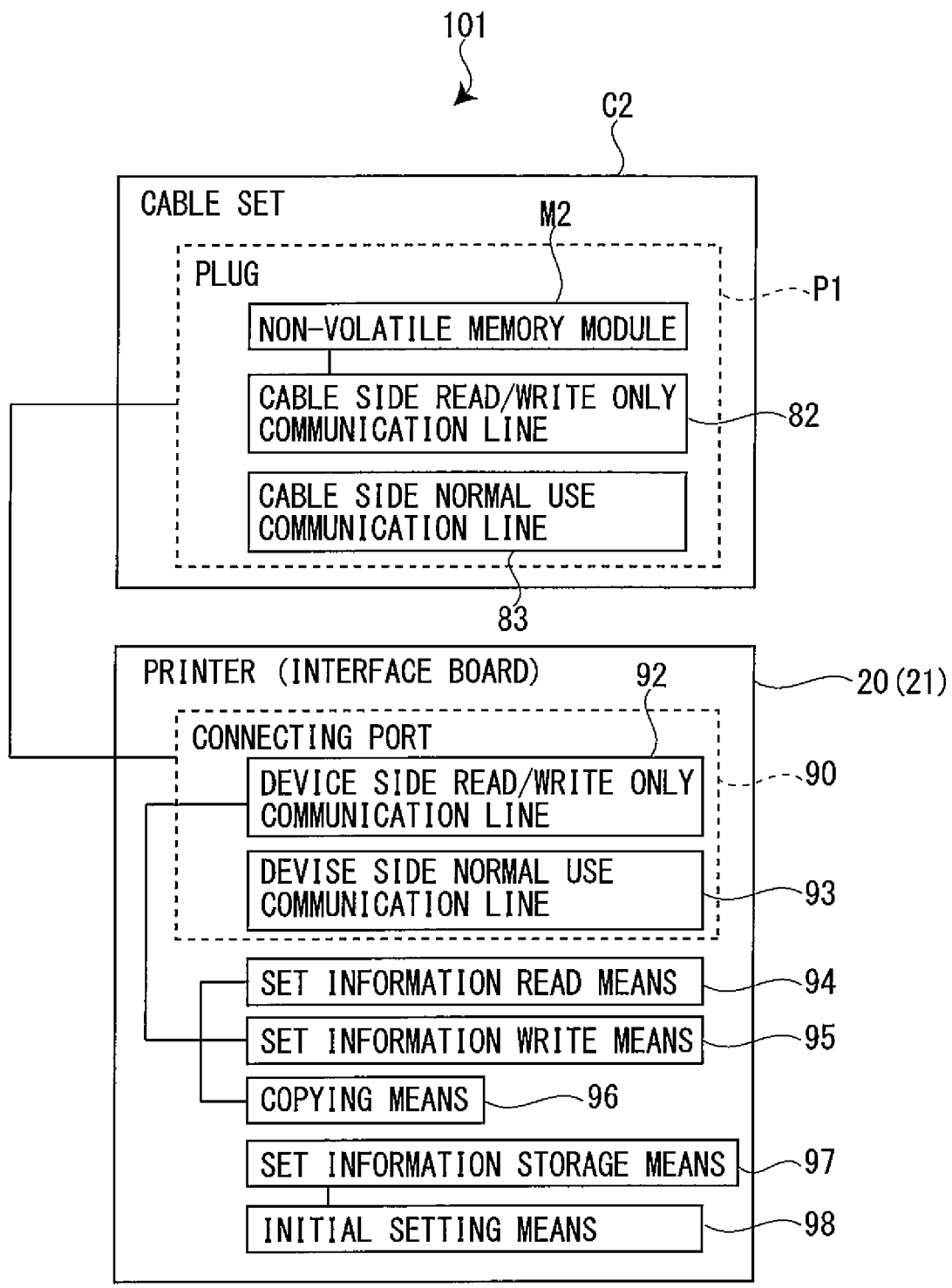
FIG. 5 is a function block diagram of a network system according to a first embodiment.

Next, with reference to FIG. 5, a control configuration for the network system 101 will be described. As described above, the cable set C2 has the plugs P1 and P2 attached to its both ends. The plug P1 on the printer side includes the non-volatile memory module M2, the cable side read/write only communication line 82, and the cable side normal use communication line 83.

The non-volatile memory module M2 stores the IP address and the operation mode information as information for performing the initial setting for the printer 20. The information can be written or deleted by using a dedicated apparatus. Also, it is possible to read the information stored in the printer 20 (set information storage means 97 which will be described later) and write the information to the non-volatile memory module M2. The "operation mode information" refers to information related to whether the printer 20 is set in a receipt mode to function for issuing a receipt or a voucher mode to function for issuing a voucher.

The cable side read/write only communication line 82 refers to, as described above, the communication lines of the pin numbers 0 and 9 (82a and 82b, refer to FIGS. 4A and 4B). The cable side read/write only communication line 82 is connected to a device side read/write only communication line 92 which will be described later and used for communications with the non-volatile memory module M2 and the set information storage means 97 which will be described later. Also, the cable side normal use communication line 83 refers to communication lines of the pin numbers 1 to 8 and is used for communications with the printer 20 and an arbitrarily device connected to the other end of the cable set C2 (the hub 60 in the case of this embodiment, refer to FIG. 1 or 2).

On the other hand, the printer 20 includes, in addition to the connecting port 90 to which the above-mentioned plug P1 is connected, set information read means 94, set information write means 95, copying means 96, the set information storage means 97, and initial setting means 98. It should be noted that these means 94 to 98 function on the basis of the interface board 21 but do not function on the printer main body side.

The connecting port 90 includes the device side read/write only communication line 92 and a device side normal use communication line 93 respectively connected to the cable side read/write only communication line 82 and the cable side normal use communication line 83 described above. Also, in accordance with the module type of the plug P1, the connector 91 of the RJ45 type (refer to FIG. 6) is attached.

The set information read means 94 reads the set information (the IP address and the operation mode information) from the non-volatile memory module M2 via the cable side read/write only communication line 82 and the device side read/write only communication line 92. Also, similarly, the set information write means 95 writes the set information stored in the set information storage means 97 to the non-volatile memory module M2 via the cable side read/write only communication line 82 and the device side read/write only communication line 92.

The copying means 96 function in cooperation with the above-mentioned set information read means 94 and the set information write means 95 in accordance with the predetermined rule to copy the set information stored in the non-volatile memory module M2 or the set information storage means 97 to the other side. The "predetermined rule" in the case of this embodiment indicates that in a case where the set information is written in one side but is not written in the other side, the copying is performed from the side where the set information is written to the side where the set information is not written, and in a case where the set information is written in both the side, both pieces of the set information are printed on the printed matter 24 (refer to FIG. 2), and in accordance with an instruction from the user who has checked the printed results (a press of the operation buttons 25, refer to FIG. 2), one piece of the information is copied to the other side.

The set information storage means 97 stores the (copied) set information read from the non-volatile memory module M2 in a non-volatile manner. Therefore, in a new state (a state before the cable set C2 is connected for the first time after the shipment), no information is written therein.

The initial setting means 98 performs the initial setting on the basis of the set information stored in the set information storage means 97. In the case of this embodiment, the "initial setting" refers to a setting of an IP address and a setting of an operation mode.

Figure 6:
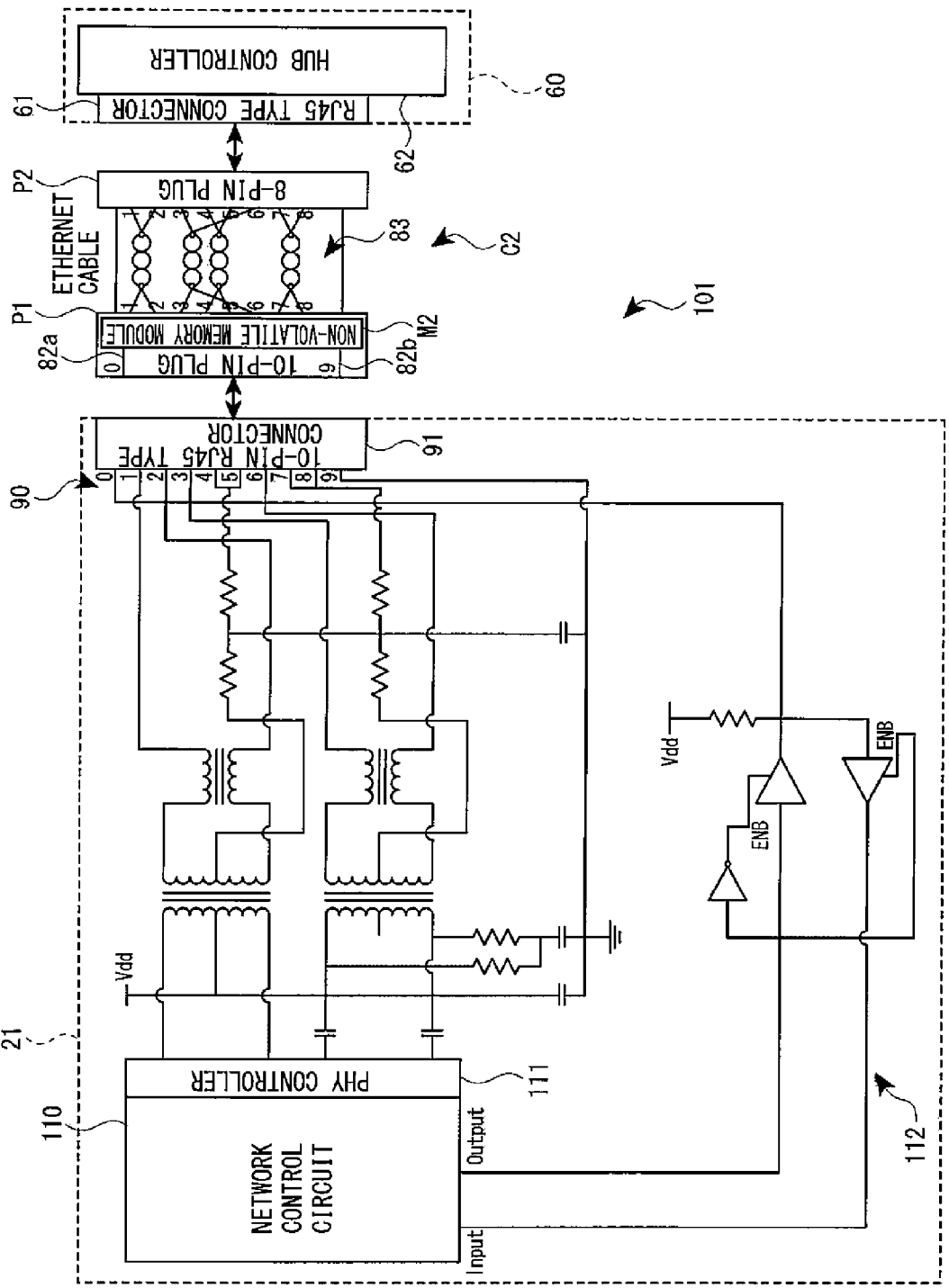
FIG. 6 is a circuit diagram of a network system as a first example according to the first embodiment.
Figure 9:
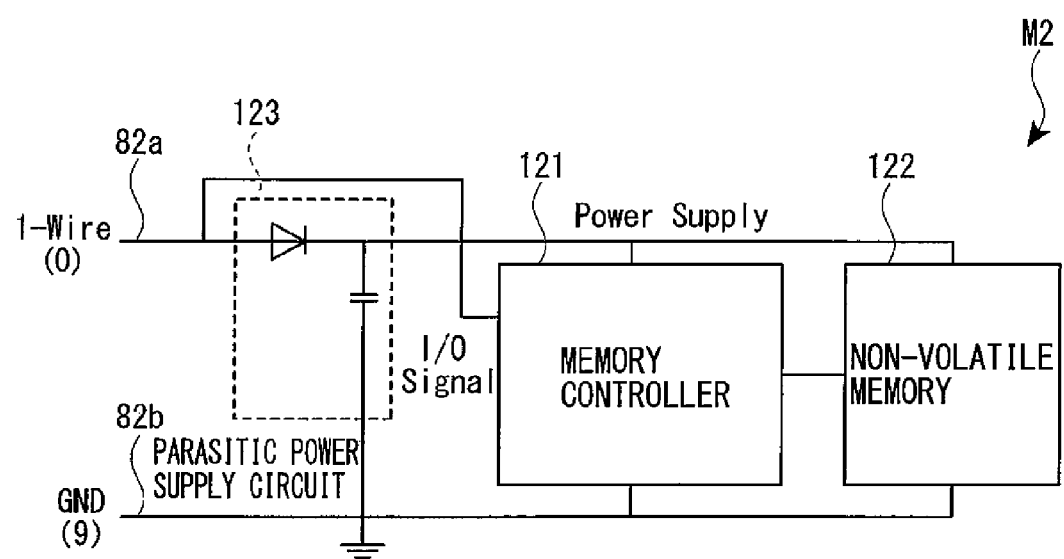
FIG. 9 is a circuit diagram of a non-volatile memory module.

Next, with reference to FIGS. 6 and 9, a circuit configuration of the network system 101 will be described. FIG. 6 illustrates circuit configurations of the cable set C2 and the interface board 21, FIG. 9 illustrates a circuit configuration of the non-volatile memory module M2.

As shown in FIG. 6, the cable set C2 has the plugs P1 and P2 of the RJ45 type (the plug P1 on the printer side has ten pins and the plug P2 on the hub has eight pins) at both ends and adopts 100BASE-T4 standard of Ethernet (registered trademark). The 100BASE-T4 standard uses four pairs of twist pair cables including the pin numbers 1-2, the pin numbers 3-6, the pin numbers 4-5, and the pin numbers 7-8, and uses three of them for data transfer (for transmission and reception) and the other one for collision detection.

In addition, the plug P1 on the printer side has the non-volatile memory module M2 connected to the pin numbers 0 and 9. As shown in FIG. 9, the non-volatile memory module M2 can perform the power supply feed and communication by using the 1-Wire line (connection based on one communication line). The non-volatile memory module M2 includes the non-volatile memory 122 for storing the set information, a memory controller 121 for controlling the read and write of the information with the non-volatile memory 122, and a parasitic power supply circuit 123 for performing the power supply feed to them. Also, the pin number 0 of the cable side read/write only communication line 82 (the communication line 82a) is used as the 1-Wire line, and the pin number 9 (the communication line 82b) is used as the GND line.

The parasitic power supply circuit 123 functions for charge capture during a high level period of a 1-Wire waveform (a variable pulse width serial communication for data I/O) and for back flow prevention during a low level period. Also, in addition to the above-mentioned set information, a 64 bit serial number which is inherit to the non-volatile memory module and cannot be changed is written in the non-volatile memory 122, and can also be used for identifying the final product device (the cable set C2).

On the other hand, the plug P2 on the hub is an eight pin plug as shown in FIG. 6, and is connected to a modular connector 61 of the RJ45 type (refer to FIG. 2) provided to the hub 60. Also, the hub 60 is provided with a hub controller 62 for controlling a communication via the eight normal use communication lines.

Furthermore, the interface board 21 of the printer 20 includes a ten pin modular connector 91 of the RJ45 type to which the above-mentioned ten pin plug P1 is connected, a network control circuit 110 for controlling signals input to and output from the interface board 21, and a power supply circuit 112 connected to them.

The network control circuit 110 performs the initial setting on the basis of the set information read and written via the device side read/write only communication line 92 of the pin numbers 0 and 9, and a communication control with the hub 60 (the hub controller) via a PHY controller 111 and the device side normal use communication line 93. It should be noted that the set information read means 94, the set information write means 95, the copying means 96, the set information storage means 97, and the initial setting means 98 shown in FIG. 5 function with the network control circuit 110 operating as the main unit.

Next, with reference to a flowchart of FIG. 10, a control method for the network system 101 mainly controlled by the above-mentioned network control circuit 110 will be described. When the interface board 21 is connected to the cable set C2 (when the connecting port 90 (the RJ45 type ten pin connector 91) is inserted to the plug P1 of the cable set C2) (S11), the network control circuit 110 determines whether or not the set information is written in the set information storage means 97 (refer to FIG. 5) (S12). In a case where the set information is written in the set information storage means 97 (S12, Yes), it is determined whether or not the set information is written in the non-volatile memory module M2 via the device side read/write only communication line 92 and the cable side read/write only communication line 82 (S13).

Herein, in a case where the set information is written in the non-volatile memory module M2, that is, in a case where the set information is written in both the set information storage means 97 and the non-volatile memory module M2 (S13: Yes), the set information written in them is printed as text data on the printed matter 24 (S14). Based on this print content, the user determines whether the set information stored in the set information storage means 97 or the set information stored in the non-volatile memory module M2 is used, and presses the operation buttons 25 (the instruction obtaining means) of the printer 20. At this time, a "button 1" is pressed in a case of using the set information stored in the set information storage means 97, and a "button 2" is pressed in a case of using the set information stored in the non-volatile memory module M2.

Therefore, when the "button 1" is pressed by the user (S15: button 1), the set information stored in the set information storage means 97 is written to the non-volatile memory module M2 (copied and overwritten) (S16), and the processing is ended. That is, in this case, the initial setting is not performed, and the existing set information stored on the printer side (the set information storage means 97) is used.

Meanwhile, when the "button 2" is pressed by the user (S15: button 2), the set information stored in the non-volatile memory module M2 is written to the set information storage means 97 (copied and overwritten) to perform the initial setting (S17), and the processing is ended.

On the other hand, in a case where the set information is not written in the set information storage means 97 (S12: No), it is determined whether the set information is written in the non-volatile memory module M2 or not (S18). When the set information is written (S18: Yes), the set information stored in the non-volatile memory module M2 is written to the set information storage means 97 (copied) to perform the initial setting (S17), and the processing is ended. Then, in a case where the set information is not written in both the set information storage means 97 and the non-volatile memory module M2 (S18: No), read and write of the set information are not performed and the processing is ended.

In this manner, the network system 101 according to this embodiment automatically performs the initial setting through a connection of the cable set C2 to which the non-volatile memory module M2 is mounted in accordance with the "predetermined rule", thus achieving the reduction of labor and costs for the initial setting. Also, in a case where the printer 20 connected to the network of the POS system 1 is broken down, if the set information of the printer 20 is copied to the non-volatile memory module M2 of the cable set C2 by inserting and removing the cable set C2, it is possible to write the same setting information to the newly introduced printer 20 (no information is written in the set information storage means 97), which is convenient for a case where the IP address is determined for each setting location (a certain arbitrary cable) or the like.

Figure 11:
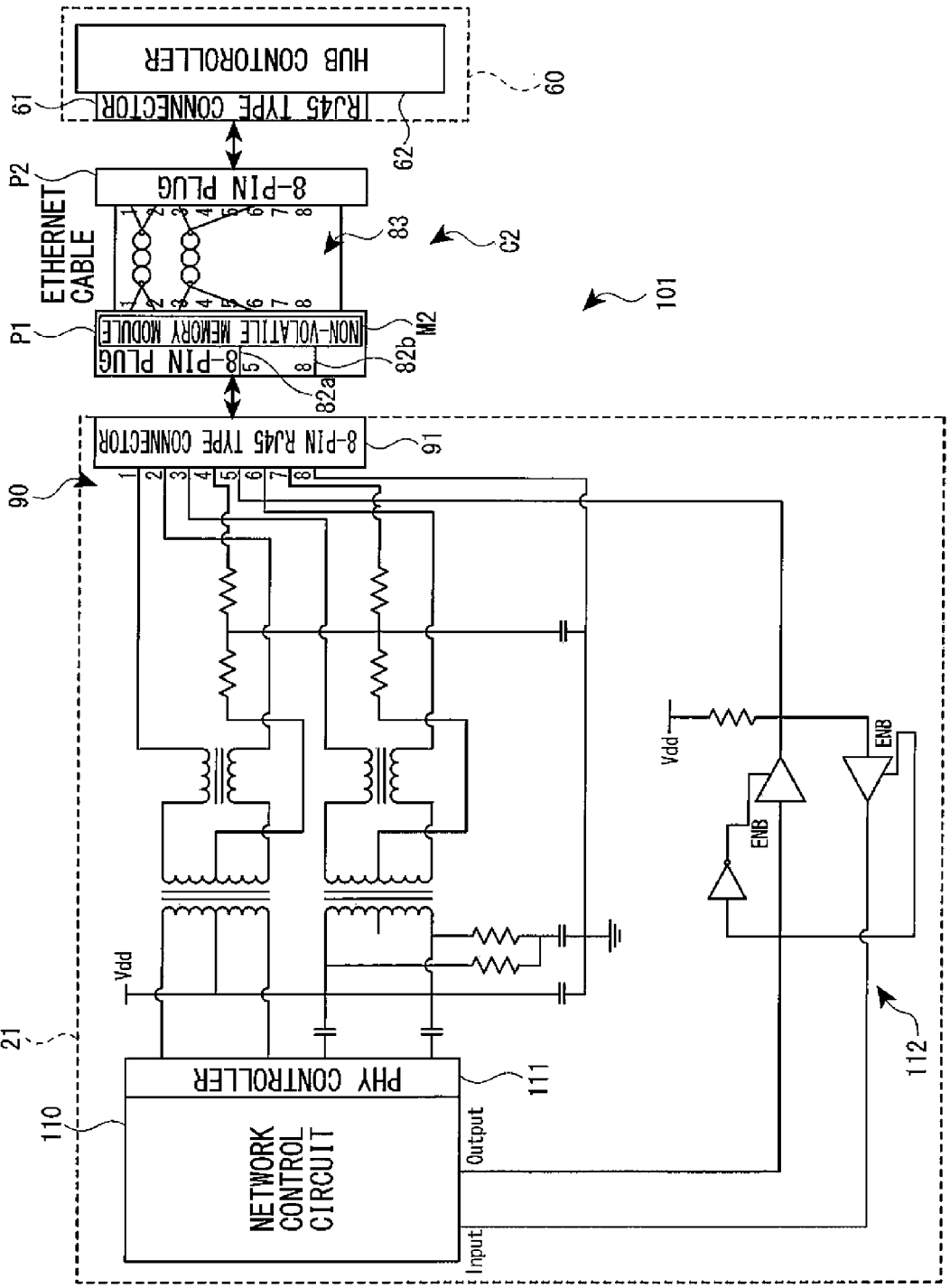
FIG. 11 is a circuit diagram of another example of the network system.

It should be noted that in the above-mentioned example, as shown in FIG. 6, the case where the cable of the 100BASE-TX standard is used has been exemplified. However, as shown in FIG. 11, a cable of 100BASE-TX standard may also be used. The 100BASE-TX standard uses two pairs of twist pair cables of pin numbers 1-2 and pin numbers 3-6. One pair of them is used for data transmission and the other pair is used for data reception. Also, for the cable side read/write only communication line 82 and the device side read/write only communication line 93, pin numbers 5 and 8 which are not used for the cable side normal use communication line 83 and the device side normal use communication line 93 are used. The pin number 5 is used as a 1-Wire line of the non-volatile memory module M2, and the pin number 8 is used as the GND line.

It should be noted that the 1-Wire lines doubling as power supply line and the signal line are not necessarily used for the read/write only communication lines 82 and 92. Such a configuration may also be adopted that the power supply line, the signal line, the GND line, and at least three communication lines are added to be arranged in addition to the normal use communication lines 83 and 93. Also, instead of adding and arranging the read/write only communication lines 82 and 92, a part or all of the existing normal use communication lines 83 and 93 may double as the read/write only communication lines 82 and 92.

Also, the standard for the cable is not limited to the above-mentioned example. The 10BASE-T or 1000BASE-T standard may also be used and a specification other than the Ethernet (trademark) specification may also be adopted. Also, accordingly, the shapes of the plug and the connector are not limited to the above-mentioned examples.

Also, in the above-mentioned example, the non-volatile memory module M is mounted on the plug P1, but may be mounted to the inside or outside of the cable cover.

Figure 7:
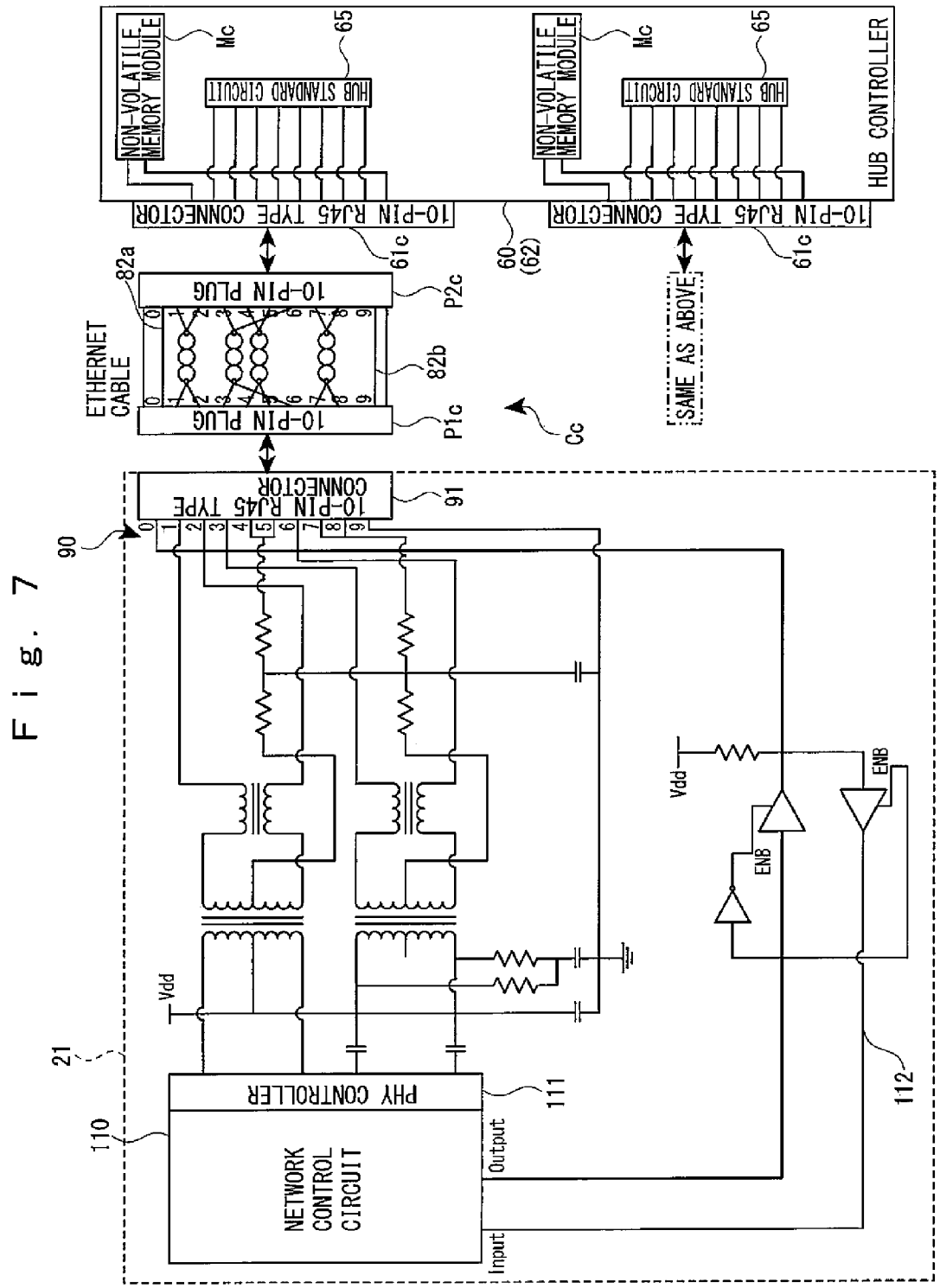
FIG. 7 is a circuit diagram of a network system as a second example according to the first embodiment.

Also, the initial setting for the printer 20 may be performed on the basis of the set information written in the non-volatile memory module Mc mounted to the hub 60, not the cable set C2. As shown in FIG. 7, in this case, the cable set having the ten pin plugs P1c and P2c provided at both ends and no non-volatile memory module M mounted is used (Cc), and the hub 60 provided with a plurality of ten pin RJ45 type connectors 61c (only two connectors are shown in the drawing), a hub standard circuit 65 provided for each connector

61c (for each port), and the non-volatile memory module Mc is used. It should be noted that, in this case, the cable length of the cable side read/write only communication lines 82a and 82b becomes long, and it is preferably to set a countermeasure for preventing the signal degradation.

Figure 8:
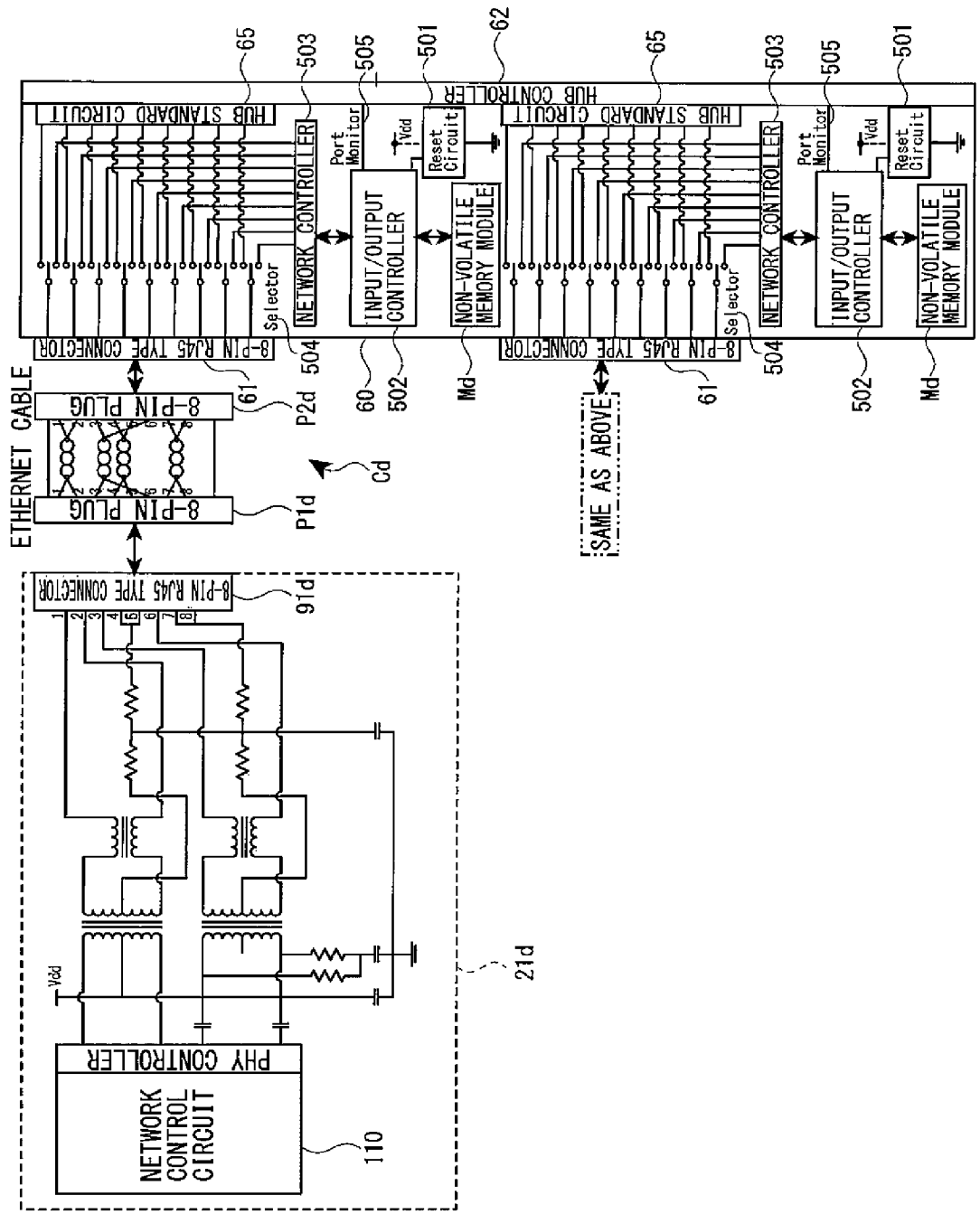
FIG. 8 is a circuit diagram of a network system as a third example according to the first embodiment.

Also, as shown in FIG. 8, a general purpose cable Cd having the eight pin plug P1d and P2d provided at both ends can also be used. That is, the non-volatile memory module Md for each connector 61 (for each port), a network controller 503 for performing a communication with a network device connected to each connector 61, and an input/output controller 502 (control CPU) for controlling an input and an output of data with respect to the non-volatile memory module Md are mounted on the hub 60. Then, the input/output controller 502 switches a selection switch 504 when a reset 501 after the ON state of the power supply is cancelled or a port monitor signal 605 from the hub controller 62 informs about a connection of the network device to each connector 61 (each port) and also transmits the information communicated via the network device to each connector 61 and the network controller 503 and stored in the non-volatile memory module Md to the network control circuit 110 on the printer side (the set information transmission means). That is, at the start of the communication between the hub 60 and the printer 20 (the interface board 21), a communication is performed with the network device 110 connected to each connector of the hub 60 on the one to one connection, so that the set information read from the non-volatile memory module Md may be transmitted to the connected network device 110. On the other hand, the interface board 21d on the printer side obtains the information (set information obtaining means), and on the basis of this, the rewrite, selection, copying, etc., of the content saved in the initial setting processing (the set information storage means 97 (refer to FIG. 5) is performed by the network control circuit 110. According to this configuration, with a simple configuration only including the printer 20 and the hub 60, by using the general purpose plug and cable, it is possible to construct the network system 101 according to this embodiment. Also, the interface board 21d can adopt a general purpose eight pin connector 91d, and also it is possible to simplify the circuit configuration as compared with the examples of FIGS. 6 and 7.

In addition, in the above-mentioned example, the device side read/write only communication line 92 and the cable side read/write only communication line 82 are used for reading and writing the non-volatile memory module M. However, a RFID (Radio Frequency Identification) is used as the non-volatile memory module M, and a configuration where these read/write only communication lines 82 and 92 are omitted may be adopted. It should be noted that, in this case, it is necessary to mount a reader/writer (a RFID read/write apparatus) for performing a wireless communication with the RFID on the printer side. However, as in this embodiment, in a case of being applied to the POS system 1, by using the reader/writer for performing the read and write of a membership card to which the RFID is mounted and various authentications (authentications for the user ID, product ID, credit card, and the like), it becomes unnecessary to add a special apparatus for the read and write with respect to the non-volatile memory module M. Thus, the cost for constructing the system can be suppressed. It should be noted that, in this case, when the cable set provided with no RFID is connected, the reader/writer mounted on the printer side does not function and only the device side normal use communication line 93 functions.

Also, as described above, the RFID can be applied in a case where the non-volatile memory module M for each port is mounted on the hub 60. In this case, such a configuration may also be adopted that the printer 20 (the interface board 21) and the hub 60 are connected to each other via a wireless communication.

Figure 12A:
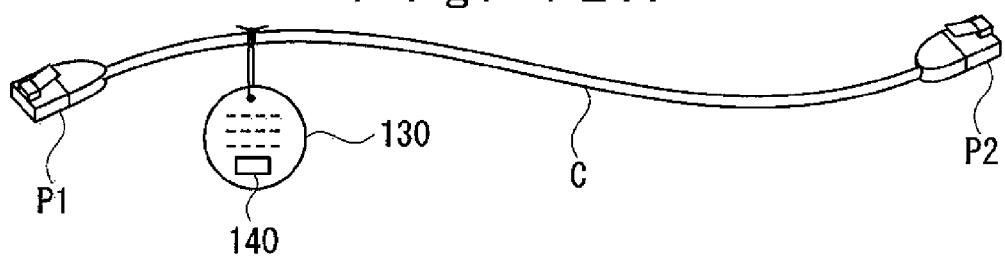
FIGS. 12A and 12B illustrate the cable set to which a RFID is mounted.

Also, when the RFID is used, it is possible to further increase the degree of freedom in the arrangement (mounting) of the non-volatile memory module M. For example, as shown in FIG. 12A, an RFID 140 may be mounted to a cable name tag 130 attached to the cable (a name tag describing a device name and the like of the connection target device) to read the set information written therein. It should be noted that, in this case, a position of the cable name tag 130 is not fixed and a consideration needs to be given on the read and write of the membership card, etc. It is thus preferable to expand the communication range by setting a plurality of antennas of the reader/writer or the like.

Figure 12B:
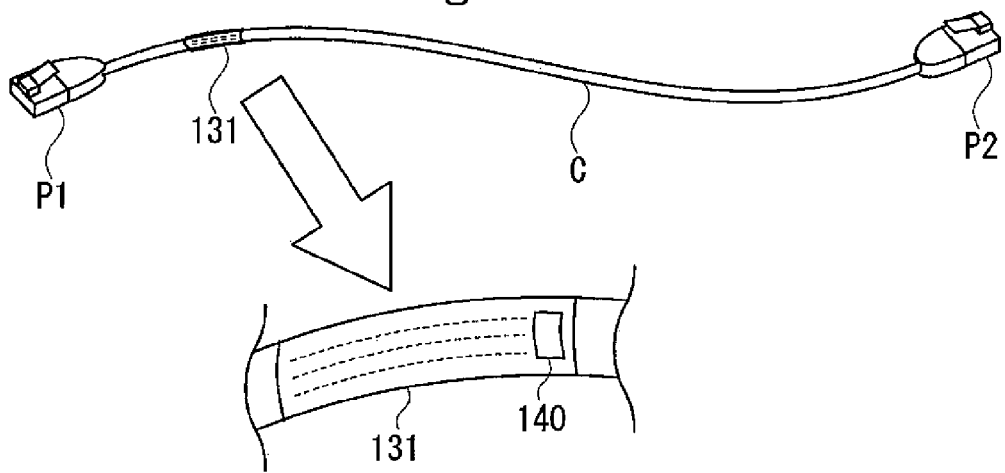

Also, as shown in FIG. 12B, the RFID 140 may be embedded in a label 131 affixed around the cable, not in the cable name tag 130. According to this configuration, it is possible to more easily construct the non-volatile memory module M at an inexpensive cost.

Figure 13:
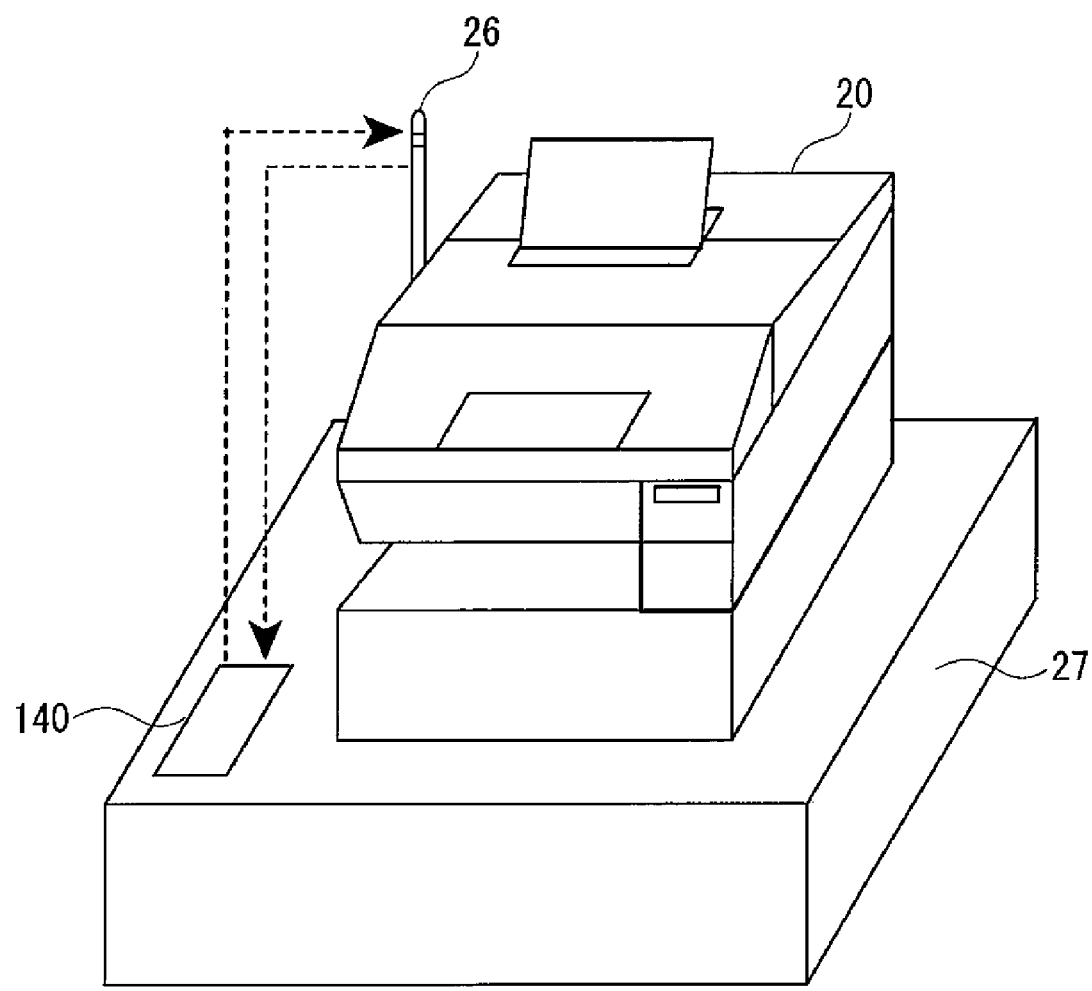
FIG. 13 illustrates a communication with a RFID tag affixed at a printer installation location.

Also, instead of mounting the RFID 140 to the cable set C2 or the hub 60, as shown in FIG. 13, a tag of the RFID 140 is affixed to the installation location of the printer 201 such as a printer installation stand 27, and through a communication with the reader/writer via the RFID 140 and an antenna 26 (FIG. 13 illustrates an example where the reader/writer is built in), the present invention may be applied to a communication system (network system) for performing the read and write of the set information. According to this configuration, even in a case where the set information is different for each installation location, the appropriate set information can be set. Furthermore, as the configuration only including the device having the reader/writer (the printer 20) and the RFID 140 is simple, it is possible to construct the system at an inexpensive cost.

Also, as an applied example, location information for identifying the installation location of the printer 20 is written in the RFID 140, and the printer 20 may read the location information to obtain the network address (IP address). Hereinafter, this applied example will be described.

This example is constructed by, for instance, the printer 20 for issuing the voucher, a voucher server connected to the printer 20 via the network for transmitting voucher information to the printer 20, and the RFID 140 (RFID tag). In this configuration, information represented by using characters and numbers such as "lane 1" and "lane 2" is stored in the RFID 140 as location information in advance. Also, the voucher server stores a correspondence table where the location information is associated with the IP address.

The operation by the printer 20 for obtaining the network address is as follows. First, when the printer 20 is installed at a lane, the printer 20 reads the location information stored in the RFID 140 to transmit the location information to the voucher server. The voucher server having received the location information refers to the correspondence table to select the IP address associated with the location information. Then, the voucher server transmits the IP address to the printer 20. The printer 20 sets the IP address received from the voucher server.

It should be noted that means for storing the location information is not limited to the RFID 140 (electronic information), and may be printed information (print information) or a mechanical construction, for example. In a case where the location information is stored as the printed information, it is possible to use a QR code, for example. With the QR code, characters, signs, binary, control codes, and the like can be represented by a two-dimensional code. As this QR code can be printed on a sticker or the like, by reading this printed QR code, the location information can be obtained. Also, in a case where the location information is stored as the mechanical construction, a method of providing at a location where the printer is installed, a concave/convex part for identifying the location or the like can be adopted. In other words, while a part of this concave/convex part is fitted with a part of the printer, the location information may be obtained.

In this manner, according to this applied example, even when the printer 20 whose IP address is not determined is installed at the respective lanes, it is possible to read the location information and obtain the IP address from the voucher server on the basis of the location information. Therefore, simply by installing the printer 20 at a desired lane, even those who have no knowledge related to the setting of the network address can use the printer 20. That is, as the printer 20 in which the setting of the IP address has been completed can communicate with the voucher server, the voucher information is obtained from the voucher server and the voucher can be printed. Also, when the IP address is associated with the corresponding POS register, the printer having received this IP address can be operated together with the POS register.

Also, in the above-mentioned example, the IP address and the operation mode (the receipt mode or the voucher mode) are set as the set information, but the operation mode may have three or more modes, or the setting may be performed for only the IP address or only the operation mode. Also, as the set information, in addition to the above-mentioned IP address and the operation mode, the communication conditions including the communication speed, the presence or absence of the parity, and the data length, the interface type, the communication arrangement of the cable set C2 (the power supply line and the communication line), the nickname of the device (the domain name and the like), the encryption key, the serial number inherit to the non-volatile memory, and the like are read, and these may be used for the initial setting.

Also, a pass word for performing the read and write of the non-volatile memory module M is provided on the printer 20 side, and the non-volatile memory module M may prohibit the read and write from the device which does not have the pass word.

Also, the above-mentioned part or entire set information written in the non-volatile memory may be encrypted on the basis of information associated with a part of the set information. In this case, with use of a 64 bit serial number which is inherit to the non-volatile memory module M and a product code which can be opened to the public, encryption is performed on a part or all pieces of the set information. After that, the 64 bit serial number is transmitted to a serial number verification server (not shown in the drawing) via the network, and the validity and the uniqueness are preferably verified. Also, the product code is used to obtain an encryption key inherit to the product from a predetermined Web server, and the encryption may be performed in combination between the encryption key and the serial number. Also, in a case where the encryption key is obtained via the network in this way, an encrypted communication such as SSL is preferably used. According to these configurations, it is possible to prevent an unauthorized read of the non-volatile memory module M.

Figure 10:
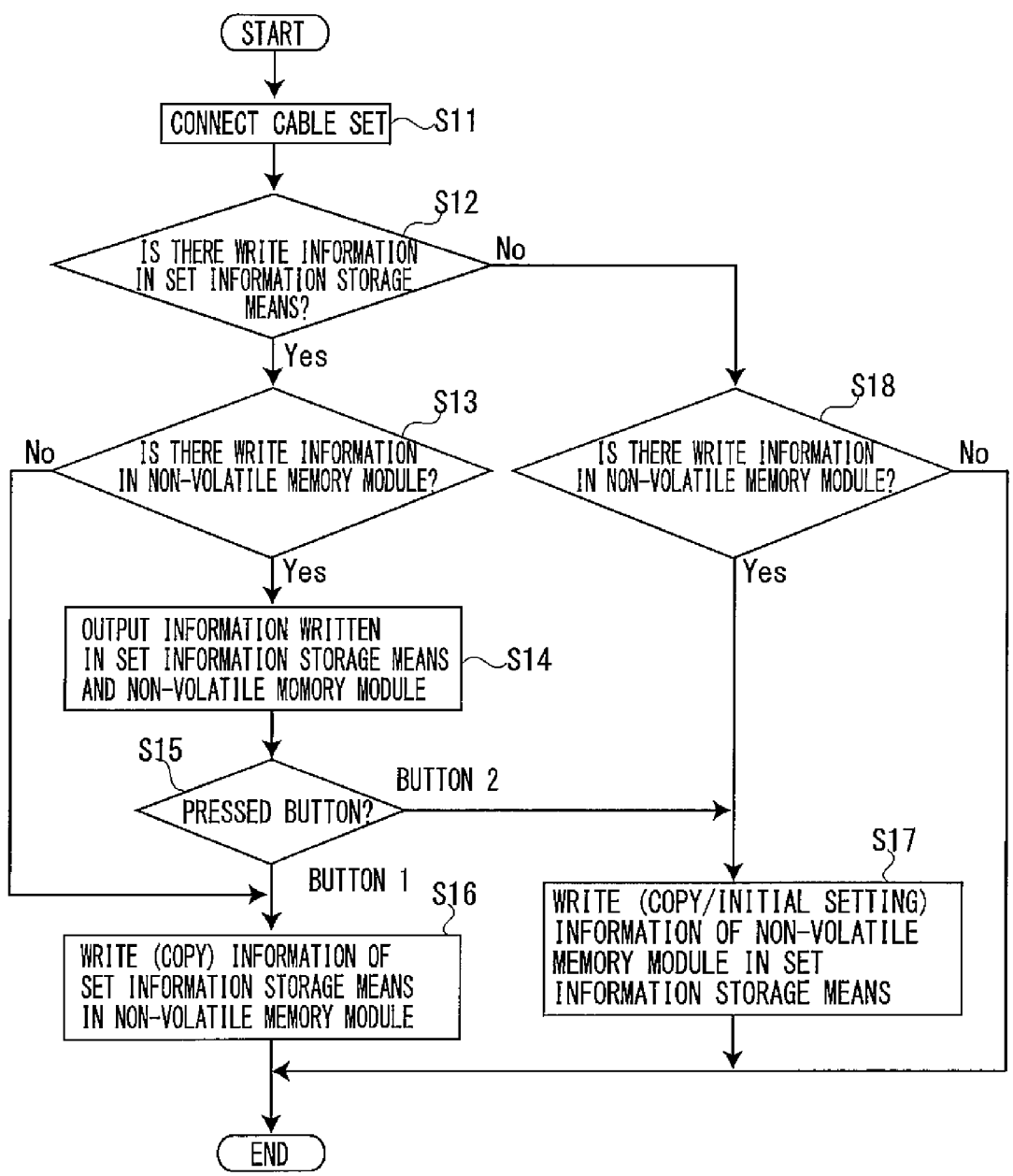
FIG. 10 is a flowchart showing a control method for the network system according to the first embodiment.

Also, in the above-mentioned example, the execution of the flowchart shown in FIG. 10 is started at the time of the connection of the cable set C2, but the execution may be started at the time of turning ON of the power supply for the printer 20 or the starting time of the initial setting for the printer 20. Also, the execution may be performed when a plurality of conditions are met among the time of the connection of the cable set C2, the time of turning ON of the power supply for the printer 20, and the starting time of the initial setting for the printer 20.

Also, with use of the network control circuit 110 in the interface board 21, the execution of the flowchart shown in FIG. 10 is performed, but the control may be performed on the printer main body side. That is, such a configuration may also be adopted that the connecting port 90, the set information read means 94, the set information write means 95, the copying means 96, the set information storage means 97, and the initial setting means 98 in the block diagram shown in FIG. 5 are provided on the main body side as well.

Also, in the above-mentioned example, the network system 101 composed of the printer 20 and the cable set C2 has been exemplified, but in a case where the cable C1 to which the non-volatile memory module M1 is mounted or the cable C6 to which the non-volatile memory module M6 is mounted (refer to FIG. 1) is used for performing the initial setting for the personal computer POS 10, the present invention can be applied. Also, in a case where the communication condition or the signal line type is set as the initial setting, the cable C3 provided with the non-volatile memory M3, the cable C4 provided with the non-volatile memory M4, or the cable C5 provided with the non-volatile memory M5 may be used to perform the initial setting for the printer 20. Also, the non-volatile memory module M is mounted on the customer display side, on the cash drawer side, and on the keyboard side of the respective cables C3, C4, and C5 (with respect to the cables C3, C4, and C5, on the other ends to M3, M4, and M5 shown in the drawing), and the initial setting can be respectively performed for the customer display 30, the cash drawer 40, and the key board 50. That is, any types of device and set information may be used.

Thus far, as described above, according to this embodiment, the device such as the printer 20 reads the set information for performing the initial setting of itself from the non-volatile memory module M mounted to the connected cable set C2 (the cable provided with the non-volatile memory module), and it is possible to automatically perform the initial setting on the basis of the set information. That is, it is unnecessary to perform the operation for the initial setting by an operator, and thus the suppression of the maintenance cost for the network system 101 can be achieved.

Also, in a case where the information is written in both the set information storage means 97 and the non-volatile memory module M, both pieces of the set information stored are printed and output, and it is possible to depending on a determination by the user as to which set information is to be matched with. Therefore, it is possible to use the device in which the set information is even written in the set information storage means 97 as a new device (a device after the replacement). It should be noted that the output mode for the set information can be changed depending on devices. For example, in a case of a display, the output can be performed by displaying the set information. Also, in a case of the simple set information, the information can be output by using an LED, an electronic sound, and the like.

Also, as the cable set C2 uses the plug P of the RJ45 type and the connector, even in a where the cable set C to which the non-volatile memory module M is not mounted, that is, the cable provided with no cable side read/write only communication line 92 is connected, by using the eight communication lines (normal use communication lines) in the center, it is possible to perform the normal communication (communication other than the read and write of the set information.

Also, the cable side read/write only communication line 82 and the device side read/write only communication line 92 are composed of the single communication line (1-Wire line) in which the power supply line and the signal line are used in common, and it is thus possible to suppress the number of the communication lines that are additionally provided for the cable side read/write only communication line 82 and the device side read/write only communication line 92 is one or two in total together with the GND line.

Also, the non-volatile memory module M2 is mounted to the plug P1 which is attached at the end on the printer side of the cable set C2 (on the device side which perform the initial setting), and it is thus possible to shorten the length of the cable side read/write only communication line 82 as much as possible. Also, as it suffices that the non-volatile memory module M is mounted to the plug P (held by the communication line holding plate 81, refer to FIGS. 4A and 4B), the mounting (attachment) can be easily performed.

Subsequently, with reference to FIGS. 14 and 15, a second embodiment according to the present invention will be described. According to the above-mentioned first embodiment, the set information is stored in the non-volatile memory module M and the set information is read to perform the initial setting for the device (the printer 20). According to this embodiment, the power supply information related to the power supply request and the circuit information related to the circuit configuration are stored in the non-volatile memory module M2 and these pieces of information are read to determine whether the power supply feed or the communication between the two devices is permitted or not.

In view of the above, according to this embodiment, a power supply feed system (the network system) 201 (refer to FIG. 14) in which the keyboard 50, the printer 20, and the cable set C5 connecting them are used among the components shown in FIG. 1 will be described as an example. Also, a description for the same contents as those of the first embodiment will be appropriately omitted.

Figure 14:
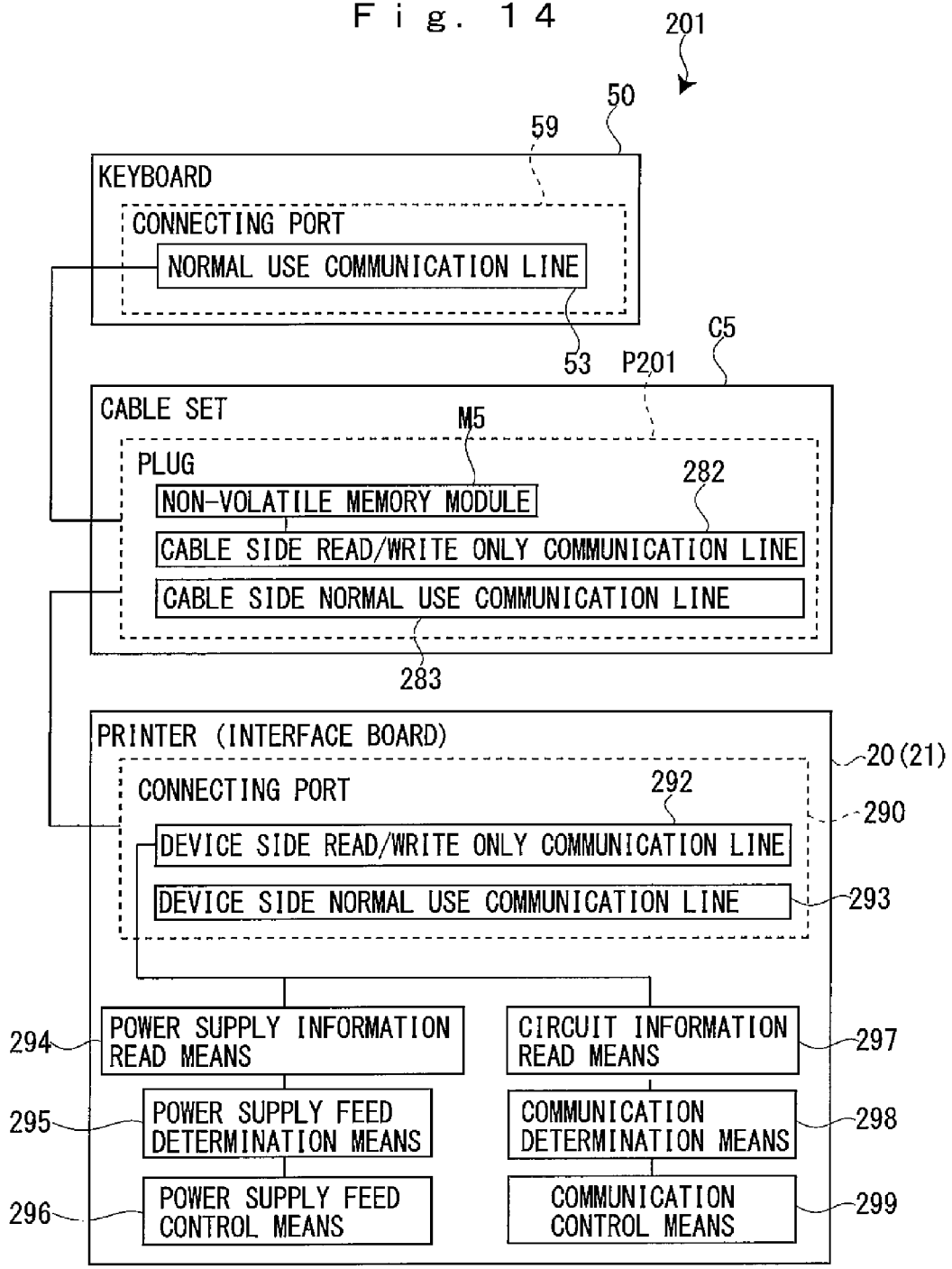
FIG. 14 is a function block diagram of a power supply feed system according to a second embodiment.

FIG. 14 is a block diagram showing a control configuration for the power supply feed system 201 according to a second embodiment. As described above, the power supply feed system 201 is composed of the keyboard 50, the printer 20, and the cable set C5. Among them, the keyboard 50 is equivalent to a device which needs the power supply feed (the first device), and the printer 20 is equivalent to a device which performs the power supply feed (the second device).

The keyboard 50 is provided with a connecting port 59. The connecting port 59 is provided with a normal use communication line 53. Also, the normal use communication line 53 includes a power supply line for receiving the power supply feed and a signal line for performing a communication with the printer 20.

The cable set C5 is provided with a plug P201 on the printer side. It should be noted that the cable set C5 of course has a plug on the keyboard side as well, but this is not particularly related to the gist of the invention. Thus, herein, the description and graphic representation are omitted. The plug P201 is provided with the non-volatile memory module M5, a cable side read/write only communication line (the cable side read only communication line) 282, and a cable side normal use communication line 283. The cable side read/write only communication line 282 and the cable side normal use communication line 283 include the power supply line and the signal line. It should be noted that the cable side read/write only communication line 282 can use a 1-Wire line (the power supply line doubling as the signal line) similarly to the first embodiment.

Also, the configuration of the non-volatile memory module M has a similar configuration to the configuration shown in FIG. 9. Also, the power supply information related to the power supply request of the keyboard 50 and the circuit information related to the circuit configuration of the keyboard 50 are written in the non-volatile memory 122. According to this embodiment, the cable set C5 is connected to the keyboard 50 or the cable set C5 is sold as being dedicated to the keyboard. Thus, the power supply information and the circuit information are previously written in the non-volatile memory 122. It should be noted that as the power supply information, the interface type, the consumed current, the consumed power, the arrangement of the power supply line included in the communication line, the encryption key, the 64 bit serial number inherit to the non-volatile memory module, and the like are written. Also, as the circuit information, the communication conditions including the communication speed, the presence or absence of the parity, and the data length, the encryption key, and the 64 bit serial number inherit to the non-volatile memory module are written. Then, a part or all the pieces of the information is encrypted to prevent an unauthorized read of the information.

On the other hand, the printer 20 (the interface board 21) is provided with, in addition to a connecting port 290 including a device side read/write only communication line (the device side read only communication line) 292 and a device side normal use communication line 293, power supply information read means 294, power supply feed determination means 295, power supply feed control means 296, circuit information read means 297, communication determination means 298, and communication control means 299. It should be noted that the power supply information read means 294, the power supply feed determination means 295, the power supply feed control means 296, the circuit information read means 297, the communication determination means 298, and the communication control means 299 function with the network control circuit 110 of the interface board 21 shown in FIG. 6 operating as the main unit.

In a case where the connecting port 290 uses the 100BASE-T4 standard cable shown in FIG. 10, the connecting port 290 is provided with a ten pin connector (pin numbers 0 and 9 correspond to the device side read/write only communication line 292 and pin numbers 1 to 8 correspond to the device side normal use communication line 293).

The power supply information read means 294 reads the power supply information from the non-volatile memory module M via the device side read/write only communication line 292 and the cable side read/write only communication line 282.

The power supply feed determination means 295 determines whether the printer 20 can perform the power supply feed to the keyboard 50 or not on the basis of the power supply information read by the power supply information read means 294. At this time, for example, in a case where the output ability of the printer 20 (the interface board 21) is short for the power supply request of the keyboard 50 (the consumed power and the consumed current) or a case where the output voltage of the printer 20 (the interface board 21) is not matched to the power supply request of the keyboard 50, it is determined that the power supply feed is impossible. Also, in a case where the power supply information read means 294 cannot perform the read of the power supply information (for example, in a case where the non-volatile memory module M is not mounted, a case where the non-volatile memory module M is broken down although being mounted, etc.), the power supply feed determination means 295 determines that the power supply feed is impossible.

The power supply feed control means 296 permits or prohibits the power supply feed in accordance with the determination result of the power supply feed determination means 295. Also, in a case where the power supply feed is prohibited, the error notification to the user is performed while that effect is printed on the printed matter 24. It should be noted that in a case where an LED for indicating the operation state is provided to the printer main body or the interface board 21, the error notification may be performed through the lighting or flashing of the LED. Also, by mounting the LED to the plug P201, the power supply feed control means 296 may perform a drive instruction for the LED via the device side read/write only communication line 292 and the cable side read/write only communication line 282. In addition, the error notification may be performed through an electronic sound or the like.

The circuit information read means 297 reads the circuit information from the non-volatile memory module M via the device side read/write only communication line 292 and the cable side read/write only communication line 282 similarly to the read of the power supply information by the power supply information read means 294.

The communication determination means 298 determines whether the communication with the keyboard 50 via the device side normal use communication line 293, the cable side normal use communication line 283, and the normal use communication line 59 can be performed or not on the basis of the circuit information read by the circuit information read means 297. At this time, for example, in a case where the communication conditions between the printer 20 and the keyboard 50 including the communication speed, the presence or absence of the parity, and the data length are not matched or a case where the memory specification of the non-volatile memory 122 does not allow the read by the circuit information read means 297, it is determined that the communication is impossible. Also, the determination whether the communication is possible or not is performed for each signal line. Therefore, it is also determined in some cases that a part of the signal lines can perform the communication. Furthermore, in a case where the read of the circuit information cannot be performed by the circuit information read means 297 (for example, in a case where the non-volatile memory module M is not mounted or in a case where the non-volatile memory module M is broken down although being mounted) the communication determination means 298 also determines that the communication is impossible.

The communication control means 299 permits or prohibits the communication in accordance with the determination result of the communication determination means 298. Also, in a case where the communication determination means 298 determines that a communication via a part of the signal lines is only possible, the communication via the signal line is permitted. It should be noted that similarly to the power supply feed control means 296, in a case where the communication is prohibited and/or only the communication via a part of the signal lines is permitted, the error notification is performed to the user.

Next, with reference to a flowchart of FIG. 15, a control method for the power supply feed system 201 mainly controlled by the interface board 21 (the network control circuit 110, refer to FIG. 6) will be described. When the cable set C5 is connected to the interface board 21 (S21), the power supply information read means 294 and the circuit information read means 297 reads the power supply information and the circuit information from the non-volatile memory module M (S22). Subsequently, on the basis of the power supply information read by the power supply information read means 294, the power supply feed determination means 295 determines whether the power supply feed to the keyboard 50 is possible or not (S23), in a case where it is determined that the power supply feed is possible (S23: Yes), the power supply feed control means 296 permits the power supply feed (S24). On the other hand, in a case where it is determined that the power supply feed is impossible (S23: No), the power supply feed control means 296 performs the error notification and also prohibits the power supply feed (S25).

Furthermore, on the basis of the circuit information read by the circuit information read means 297, the communication determination means 298 determines whether the communication with the keyboard 50 is possible or not (S26). In a case where it is determined that the communication is possible (S26: Yes), the communication control means 299 permits the communication (S27). On the other hand, in a case where it is determined that the communication is impossible (or only a communication via a part of the signal lines is possible) (S26: No), the communication control means 299 performs the error notification and prohibits the communication or permits the communication via the part of the signal lines (S28). It should be noted that modes for the error notification in a case of prohibiting the communication and in a case of only permitting the communication via the part of the signal lines are preferably different from each other. Also, modes for the error notification in a case of prohibiting the power supply feed and in a case of the communication (a case of only permitting the communication via the part of the signal lines) are preferably different from each other.

In this manner, through the connection of the cable set C5 to which the non-volatile memory module M is mounted, the power supply feed system 201 according to this embodiment performs the power supply feed after it is determined whether the power supply feed to the device (the keyboard 50) connected to the front of the cable set C5 is possible or not. Thus, it is possible to prevent an inappropriate incident such as a break down of a fuse in advance. Also, it is determined whether the communication is possible or not. On the basis of the determination result, the communication is permitted. Thus, the operation is not performed while the connection state is unstable. In general, the POS keyboard 50 has a large variety of types such as one to which an MSR or a display unit is mounted, and the connection is sometimes established even when the power supply output ability of the printer 20 is not matched with the power supply request of the keyboard 50. Therefore, a problem of an erroneous operation is generated due to such an inappropriate connection in some cases, but by applying the present invention, such a problem can be solved.

It should be noted that in the above-mentioned example, in a case where the power supply feed is impossible, the power supply feed control means 296 performs the error notification of that effect by the print and output, but the print content preferably includes an instruction to the user. For example, in a case where the connector of the interface board 21 is not matched to the power supply request of the keyboard 50, an instruction content that the connector (the power supply feed voltage) should be changed may be printed. Also, in a case where the interface board 21 has a plurality of connecting ports, a content for urging a connection to another connecting port which is matched to the power supply request may be instructed. Furthermore, as shown in the above-mentioned flowchart, only the communication is allowed some cases if the communication is possible even in a case where the power supply feed is impossible. In this case, another power supply is prepared, and an instruction content that the power supply feed is performed to the keyboard 50 may be printed.

Also, in the above-mentioned example, the case where the power supply PS2 is connected to the printer 20 and the power supply feed is performed to the keyboard 50 from the printer 20 via the cable set C5 has been exemplified (refer to FIG. 1). The present invention can also be applied to a case where the power supply feed is performed to the keyboard 50 from the printer 20 via a power supply cable. In this case, information indicating that the power supply feed is unnecessary to the connected device (the keyboard 50) is preferably written as the power supply information in the non-volatile memory module M which is mounted to the cable set C5 functioning as the communication cable. In this case, as the printer 20 (the power supply feed determination means 295) reads the information, it is determined that the power supply feed is impossible.

Also, in the above-mentioned example, the power supply feed is performed via the power supply line. In a case of using an interface where the power supply feed is possible via the signal line, a configuration in which the power supply line is omitted may be adopted.

Also, in the above description, the case where the present invention is applied to the LAN cable having the signal line has been exemplified. Also, the present invention may be applied to a power supply cable only having the power supply line. In this case, when a power supply tap (a power supply socket) having a rated capacity of 1500 W is set as the second device on a side performing the power supply feed and a device connected to the power supply tap is set as the first device requiring the power supply feed, the power supply tap can determine that a connection of a power supply cable which is connected to the first device requiring a power supply capacity larger than its own rated capacity cannot be established, and thus it is possible to prevent erroneous operations and the like in advance. Also, through the error notification, the user can be informed of that effect.

Figure 15:
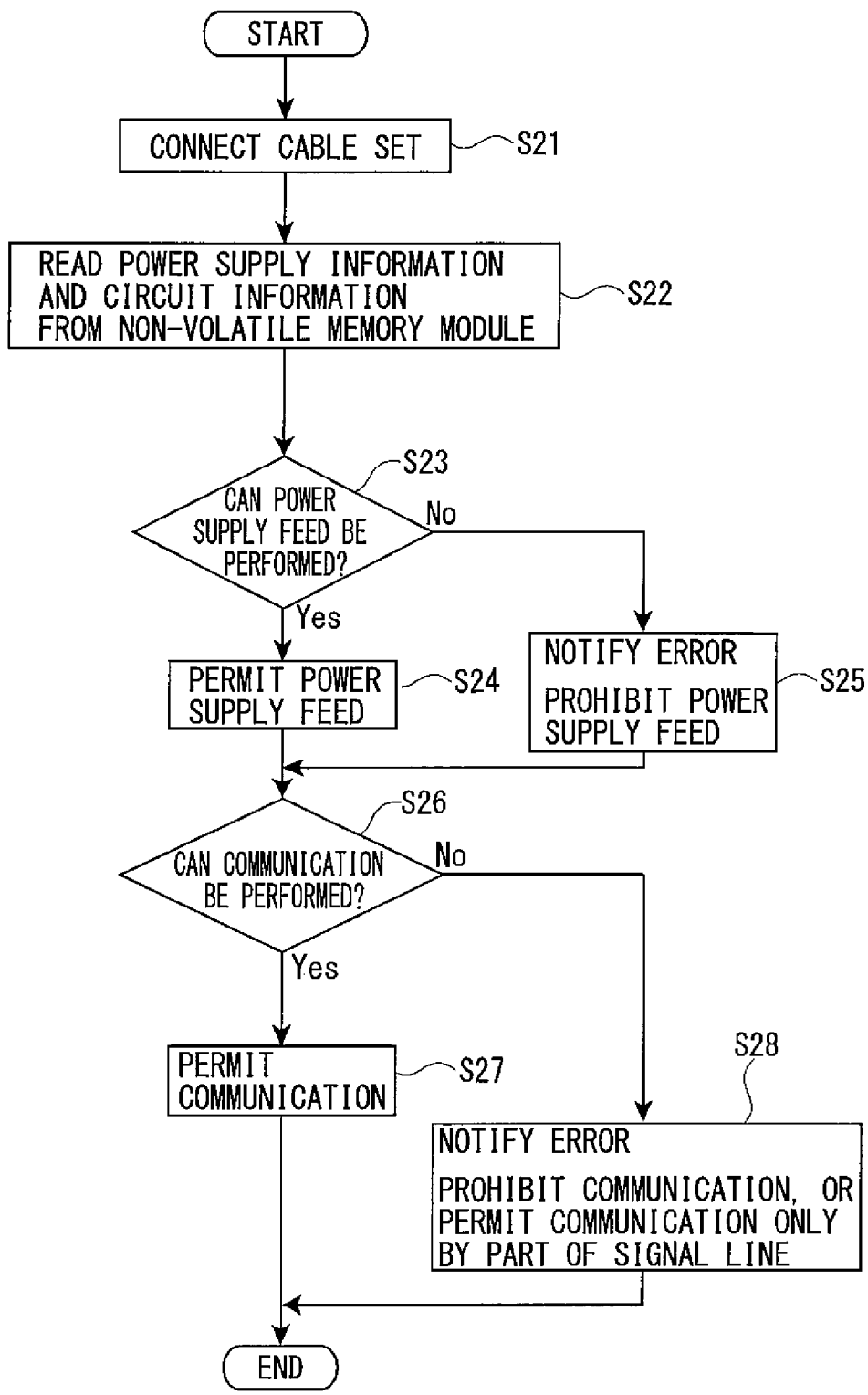
FIG. 15 is a flowchart showing a control method for the power supply feed system according to the second embodiment.

Also, in the above-mentioned example, at the connection of the cable set C5, the execution of the flowchart shown in FIG. 15 is started, but the execution may be started at the time of turning ON of the power supply to the printer 20.

Also, with use of the network control circuit 110 in the interface board 21, the flowchart shown in FIG. 15 is executed, but the control may be performed on the printer main body side. That is, such a configuration may also be adopted that the connecting port 290, the power supply information read means 294, the power supply feed determination means 295, the power supply feed control means 296, the circuit information read means 297, the communication determination means 298, and the communication control means 299 shown in the block diagram of FIG. 14 are provided on the main body side as well.

Also, in the above-mentioned example, the power supply feed system 101 composed of the printer 20, the cable set C5, and the keyboard 50 has been exemplified. The present invention can also be applied to a case where the power supply feed is performed via the cable sets C3 and C4 to the customer display 30 and the cash drawer 40. Also, the present invention can be applied to a case where the non-volatile memory module M in which the consumed power is written is mounted to the power supply PS and it is determined whether the power supply feed can be performed to the device or not.

Also, in combination with the invention according to the above-mentioned first embodiment, such a configuration may be adopted that the set information is stored in the non-volatile memory 122, and the information stored in the non-volatile memory 122 is used to determine whether the printer 20 can perform the power supply feed or the communication or not and also used to perform the initial setting for itself. In addition, the first embodiment can be appropriately applied to the cable standard, the arrangement of the communication line, the mounting method for the non-volatile memory module M and the RFID, and the like.

Thus far, as described above, according to this embodiment, the second device (the printer 20) performing the power supply feed reads the power supply information related to the power supply request of the first device (the keyboard 50) requesting the power supply feed from the non-volatile memory module M. In a case where it is determined that the power supply can be performed on the basis of the power supply information, that is, in a case where the power supply request receiving the power supply feed is matched to the power supply output ability on the side performing the power supply feed, the power supply feed is permitted, and thus it is possible to perform the appropriate power supply feed. As a result, it is possible to prevent the overload or break down of the fuse, the erroneous operations, and the like due to an inappropriate power supply feed in advance.

Also, in a case where it is determined that the power supply feed and the communication are impossible, the error notification is performed while that effect is printed and output or the like, and thus the user can find out the reason why the communication cannot be performed.

Subsequently, with reference to FIGS. 16 to 18, a third embodiment according to the present invention will be described. According to the above-mentioned first embodiment, the set information is stored in the non-volatile memory module M and the set information is read to perform the initial setting for the device (the printer 20). According to this embodiment, the inherit address of the cable set C2 (MAC address) is stored in the non-volatile memory module M in addition to the set information. The device connected to the cable set C2 switches the MAC address of itself to the MAC address of the cable set C2 read from the non-volatile memory module M for operation.

In view of the above, according to this embodiment, a network system 301 using the hub 60 (the network relay apparatus), the printer 20, and the cable set C2 connecting them among the components shown in FIG. 1 will be described as an example. Also, a description for the same contents as those of the first embodiment will be appropriately omitted.

Figure 16:
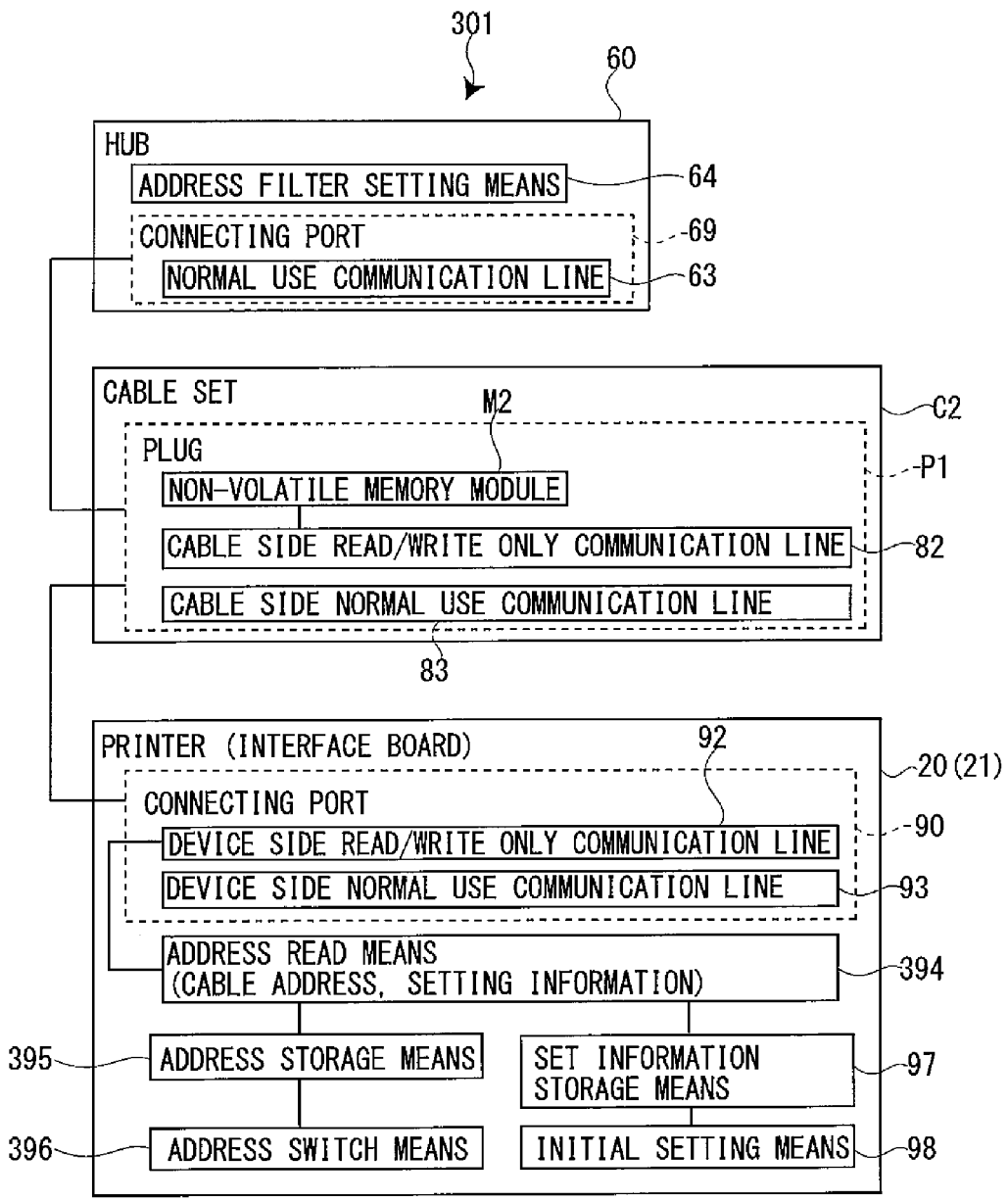
FIG. 16 is a function block diagram of a network system according to a third embodiment.
Figure 17:
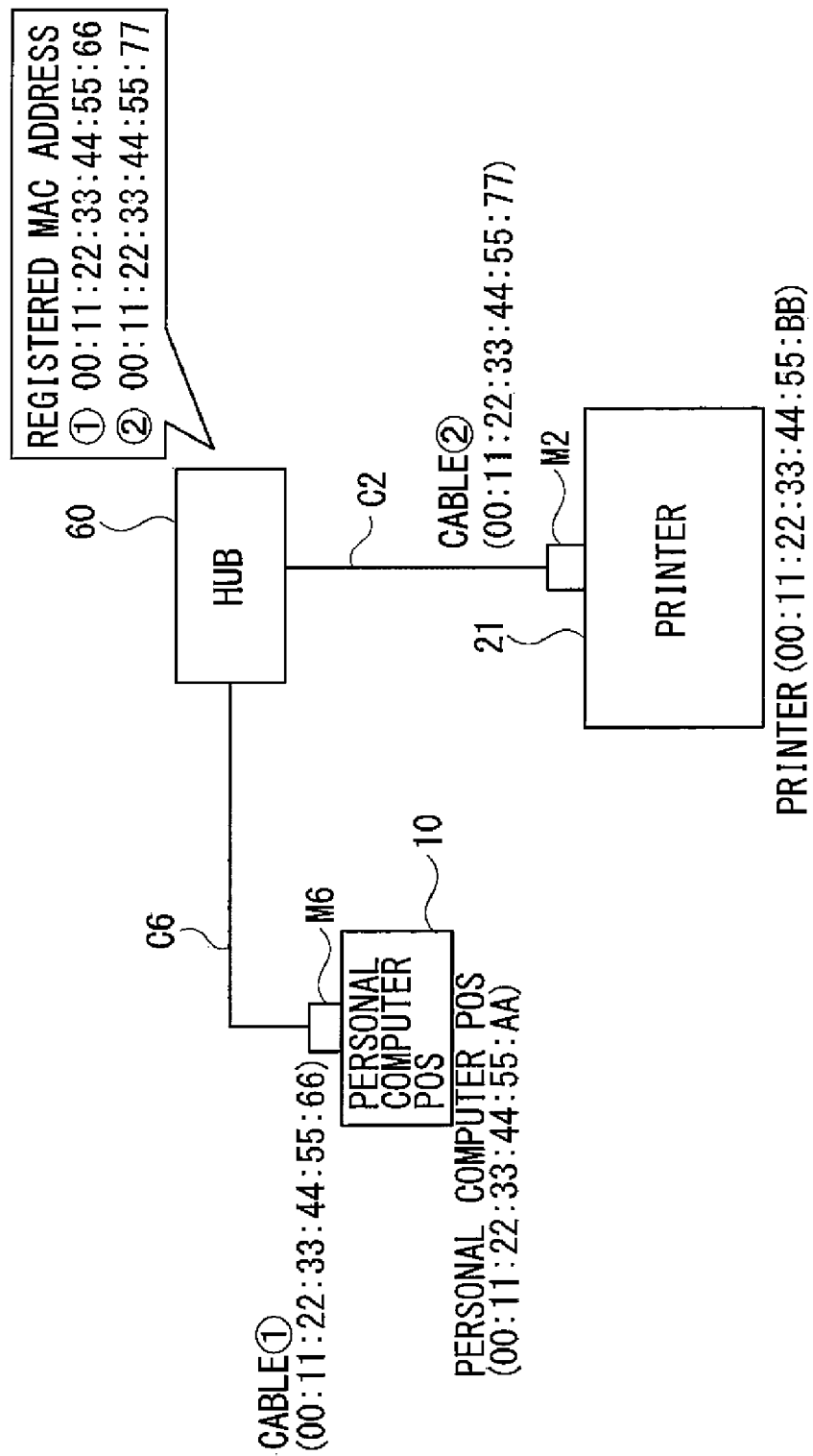
FIG. 17 is a diagram for describing a registration of a MAC address to a hub.

FIG. 16 is a block diagram for showing a control configuration for the network system 301 according to a third embodiment. As described above, the network system 301 is constructed by the hub 60, the printer 20, and the cable set C2.

The hub 60 is provided with address filter setting means 64 and a connecting port 69. The connecting port 69 includes a normal use communication line 63. That is, in a case of using the 100BASE-T4 standard cable shown in FIG. 6, an eight pin connector is provided.

The address filter setting means 64 secures the security of the network system 301 by restricting communications other than a communication by a device having the registered MAC address to set a so-called "MAC address filtering". At this time, as shown in FIG. 17, instead of the MAC address of the device connected to the hub 60 (the personal computer POS 10 and the printer 20), the MAC address of the cable set C2 (hereinafter referred to as "cable address") is registered. Therefore, two addresses including a cable address of the cable set C6 "00:11:22:33:44:55:66" and a cable address of the cable set C2 "00:11:22:33:44:55:77" are registered in the hub 60 in advance by the user.

The cable set C2 has the plug P1 on the printer side. It should be noted that the cable set C2 has a plug on the hub side as well, but this is not particularly related to the gist of the invention. Thus, herein, the description and graphic representation are omitted. The plug P1 is provided with the non-volatile memory module M2, the cable side read/write only communication line (the cable side read only communication line) 82 and the cable side normal use communication line 83. It should be noted that the cable side read/write only communication line 82 can use a 1-Wire line (the power supply line doubling as the signal line) similarly to the first embodiment.

Also, the configuration of the non-volatile memory module M has a similar configuration to the configuration shown in FIG. 9. The above-mentioned cable address "00:11:22:33:44:55:77" is previously written in the non-volatile memory 122 before the shipment. Also, similarly to the first embodiment, the set information read from a dedicated apparatus or the printer 20 can also be written.

On the other hand, the printer 20 (the interface board 21) is provided with, in addition to the connecting port 90 having the device side read/write only communication line (the device side read only communication line) 92 and the device side normal use communication line 93, address read means 394, address storage means 395, address switch means 396, set information storage means 97, and initial setting means 98. It should be noted that the address read means 394, the address storage means 395, the address switch means 396, the set information storage means 97, and the initial setting means 98 function with the network control circuit 110 shown in FIG. 6 operating as the main unit.

In a case of using the 100BASE-T4 standard cable shown in FIG. 6, the connecting port 90 is provided with a ten pin connector (pin numbers 0 and 9 correspond to the device side read/write only communication line 92, and pin numbers 1 to 8 correspond to the device side normal use communication line 93).

The address read means 394 reads the cable address and the set information from the non-volatile memory module M via the device side read/write only communication line 92 and the cable side read/write only communication line 82.

The address storage means 395 stores the cable address read by the address read means 394 from the non-volatile memory module M.

The address switch means 396 switches the MAC address of itself to the cable address stored in the address storage means 395. This switch (the storage of the cable address to the address storage means 395) is executed each time the cable set C2 to which the non-volatile memory module M2 is mounted is connected. Therefore, with the connected cable set C2, the apparent MAC address of itself (the MAC address replying to an ARP request from a device connected via the cable set C2) is changed. It should be noted that originally the MAC address allocated to the printer 20 (the interface board 21) is saved as it is, and in a case where the cable address cannot be read from the connected cable set, the address functions as the MAC address of itself.

The set information storage means 97 stores the set information read by the address read means 394 from the non-volatile memory module M. Also, the initial setting means 98 performs the initial setting on the basis of the set information stored in the set information storage means 97. It should be noted that the functions of the set information storage means 97 and the initial setting means 98 are similar to those in the first embodiment, and therefore a detailed description is omitted.

Next, with reference to a flowchart of FIG. 18, a control method for the network system 301 mainly controlled by the interface board 21 (the network control circuit, refer to FIG. 6) will be described. It should be noted that in this flowchart as well, a description for the processing related to the initial setting is omitted.

When the cable set C2 is connected (S31), the interface board 21 determines whether the MAC address (the cable address) exists or not in the non-volatile memory module M2 through the communication via the device side read/write only communication line 92 and the cable side read/write only communication line 82 (S32).

In a case where the MAC address exists (S32: Yes), the address read means 394 reads the MAC address from the non-volatile memory module M (S33), stores the MAC address in the address storage means 395 (S34), and switches the MAC address of itself to the MAC address stored in the address storage means 395, that is, the cable address (S35). That is, while the cable set C2 is connected, the address functions as the read cable address instead of the MAC address of itself.

On the other hand, in a case where the MAC address does not exist in the non-volatile memory module M (S32: No), the operation is performed with the MAC address of itself (S36). That is, in the case of the cable to which the non-volatile memory module M is not mounted or when the MAC address is not written in the non-volatile memory 122 although being mounted, the operation is performed with the MAC address of itself.

In this manner, the network system 301 according to this embodiment registers the MAC address allocated to the cable set C2 in the hub 60. As the printer 20 connected to the cable set C2 functions by switching the MAC address of itself to the cable address of the cable set C2, even in a case where the replacement is performed due to the break down of the printer 20 or the like, it is unnecessary to register the MAC address of the new printer 20 in the hub 60 again. Therefore, even in a case where the network is constructed by using the hub 60 having the MAC address filtering function, it is possible to suppress the labor for maintenance for the replacement of the printer 20.

It should be noted that in the above-mentioned example, the MAC address is used as the cable address. As long as the address is uniquely allocated to the hardware address the cable set C2, an address other than the MAC address can be used. Also, as the hardware address, the 64 bit serial number of the non-volatile memory module M2 may be used.

Also, the hub 60 is exemplified as the apparatus that can set the MAC address filtering, but the apparatus is not limited to the above. Various network relay apparatuses such as a router and an access point may also be used. Furthermore, an apparatus in which a program for the purpose of communicating only with a particular device via the network connection (a firewall program for the security) is incorporated may be used.

Also, in the above-mentioned example, the non-volatile memory module M2 is mounted on the plug P, but may be mounted to the inside or outside of the cable cover, or the RFID embedded in the cable name tag or the label may be used (refer to FIGS. 12A and 12B).

Also, the general purpose cable is used, and the non-volatile memory module M for each port is mounted on the above-mentioned hub 60. The printer 20 may read and use the MAC address (the port address) written in the non-volatile memory module M. In this case, the hub 60 registers the port address written in each non-volatile memory module M in advance, and is provided with address read means for reading the port address from the non-volatile memory module M and address transmission means for performing a communication with the printer 20 to transmit the read port address to the printer 20.

Also, the printer 20 is provided with address obtaining means for obtaining the port address transmitted by the address transmission means, address storage means for storing the thus obtained port address, and address switch means for switching the hardware address of itself to the port address stored in the address storage means. Then, the hub 60 performs a connection based on the one to one connection at the start time of the communication with the printer 20 and transmits the port address by the address transmission means (refer to FIG. 8 on the circuit configuration). It should be noted that, in a case of adopting this configuration, the cable length of the cable side read/write only communication line 82 becomes long, and it is preferable to take a countermeasure to prevent the signal degradation. According to this configuration, with the simple configuration only including the printer 20 and the hub 60, it is possible to construct the network system 301 according to this embodiment.

Also, instead of mounting the non-volatile memory module M to the cable set C2 or the hub 60, as shown in FIG. 13, the present invention may be applied to such a communication system (network system) that the tag of the RFID 140 to which the inherit MAC address is written is affixed at the installation location of the printer 20 such as the printer installation stand 27, and the MAC address is read through the communication with the RFID 140. According to this configuration, as the simple configuration only including the reader/writer of the device and the RFID tag is used, it is possible to construct the system at an inexpensive cost.

Also, in the above description, the network system 301 composed of the hub 60, the printer 20, and the cable set C2 has been exemplified. The present invention can be applied to another device connected to the hub 60 in which the cable C6 provided with the non-volatile memory module M6 (refer to FIG. 1) is used to switch the MAC address of the personal computer POS 10 to the cable address or the like.

Figure 18:
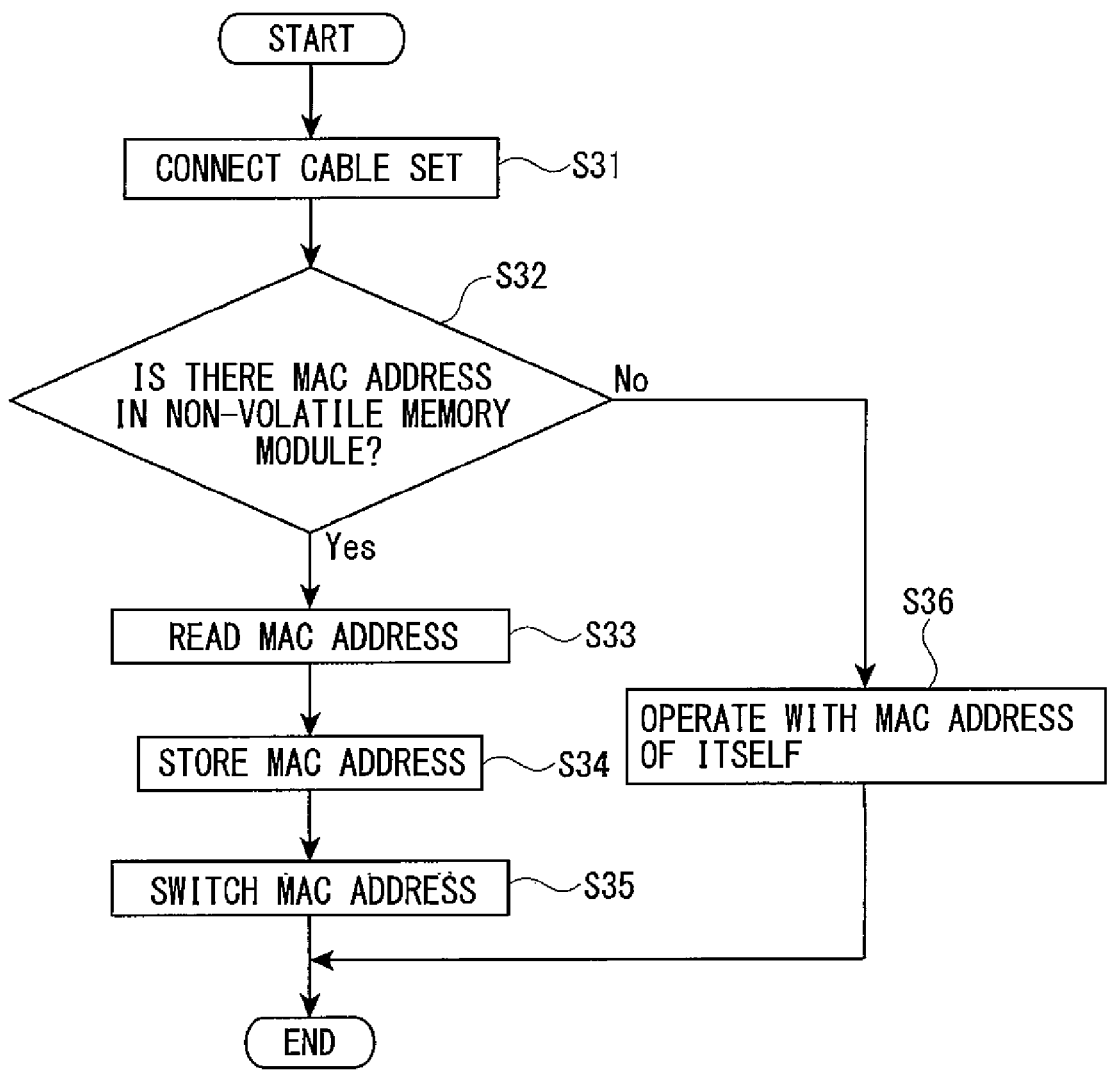
FIG. 18 is a flowchart showing a control method for the network system according to the third embodiment.

Also, in the above-mentioned example, the execution of the flowchart shown in FIG. 18 is started when the cable set C2 is connected. At the time of turning ON the power supply for the printer 20 or at the starting time of the initial setting for the device, the execution may be started.

Also, the flowchart shown in FIG. 18 is executed with use of the network control circuit 110 in the interface board 21, but the control may be performed on the printer main body side. That is, such a configuration may also be adopted that the connecting port 90, the address read means 394, the address storage means 395, the address switch means 396, the set information storage means 97, and the initial setting means 98 shown in the block diagram of FIG. 16 are provided on the main body side as well.

Also, in combination with the invention according to the above-mentioned second embodiment, the power supply information and the circuit information are stored in the non-volatile memory 122, and on these pieces of information, the printer 20 determines whether the power supply feed or the communication can be preformed or not. After that, the switch of the MAC address or the initial setting may be performed. In addition, the above-mentioned embodiment can be appropriately applied to the cable standard, the arrangement of the communication line, the mounting method for the non-volatile memory module M and the RFID, etc.

Thus far, as described above, according to this embodiment, the device (the printer 20) reads the cable address from the non-volatile memory module M of the connected cable set C2 and the MAC address of itself is changed to the read cable address. Therefore, even in a case where the device is replaced, by connecting the cable set C2 to the new device, the operation can be performed without paying attention to the address filter of the hub 60. That is, the new device functions as the cable address of the connected cable set C2 irrespective of the MAC address of itself. While the security obtained from the address filter of the hub 60 is maintained, it is possible to omit the labor for the registration or change of the hardware address of the new device.

Also, the device is not adapted to delete the MAC address originally allocated. Even in a case of being connected via the general purpose cable to which the non-volatile memory M is not mounted, that is, even in a case of not being connected to the network system 301 of the present invention, the device can function as the hardware address of itself without any hindrance.

In the above, the three embodiments have been described, but each part of the system and the apparatus shown in the respective embodiments (each function) can also be provided as a program. Also, the program can be provided while being stored in a recording medium (not shown in the drawing). As the recording medium, a CD-ROM, a flash ROM, a memory card (Compact Flash (registered trademark), smart media, a memory stick, or the like), a compact disc, an opto-magnetic disc, a digital versatile disc, a flexible disc, a hard disc, and the like can be used.

Also, irrespective of the example of the network system 101 or 301, or the power supply feed system 201 according to the above-mentioned embodiment, the system configuration, the apparatus configuration, and the like can be appropriately changed without departing from the gist of the present invention.

The invention claimed is:

1. A network system, comprising:
a cable set to which a non-volatile memory is mounted; and
a device to which the cable set is connected,
the cable set having cable side read/write only communication means for reading/writing data from/to the device,
the device having device side read/write only communication means for reading/writing data from/to the cable set; set information read means for reading set information used for performing an initial setting of the set information read means from the non-volatile memory of the cable set; initial setting means for performing an initial setting on the basis of the read set information; set information storage means for storing the set information read from the non-volatile memory; set information write means for writing the set information stored in the set information storage means to the non-volatile memory; and copying means for copying the set information stored in the set information storage means or the non-volatile memory to the other based on a predetermined rule.

2. The network system according to claim 1, wherein the predetermined rule is that the copying is performed from a side where the set information is written to a side where the set information is not written.

3. A network system, comprising:
a hub for a network to which a non-volatile memory is mounted; and
a device connected to the hub,
the hub having hub side read/write only communication means for reading/writing data from/to the device, and
the device having device side read/write only communication means for reading/writing data from/to the hub; set information read means for reading set information used for performing an initial setting of the set information read means from the non-volatile memory of the hub;

initial setting means for performing an initial setting on the basis of the read set information; set information storage means for storing the set information read from the non-volatile memory: set information write means for writing the set information stored in the set information storage means to the non-volatile memory; and copying means for copying the set information stored in the set information storage means or the non-volatile memory to the other based on a predetermined rule.

4. The network system according to claim 3, wherein the predetermined rule is that the copying is performed from a side where the set information is written to a side where the set information is not written.

5. A network system, comprising:
a device; and
an RFID tag which is affixed at an installation location of the device and stores set information used for performing an initial setting of the device,
the device having RFID read/write means for performing a wireless communication with the RFID tag; set information read means for reading set information used for performing an initial setting of the set information read means from the RFID tag; initial setting means for performing an initial setting on the basis of the read set information; set information storage means for storing the set information read from the RFID tag;
set information write means for writing the set information stored in the set information storage means to the RFID tag; and copying means for copying the set information stored in the set information storage means or the RFID tag to the other based on a predetermined rule.

6. The network system according to claim 5, wherein the predetermined rule is that the copying is performed from a side where the set information is written to a side where the set information is not written.

7. A network system, comprising:
a cable set to which a non-volatile memory is mounted;
a first device which requires a power supply via the cable set; and
a second device for performing the power supply via the cable set to the first device,
the non-volatile memory stores power supply information related to a power supply request from the first device; and
the second device comprises:
power supply information read means for reading the power supply information from the non-volatile memory of the connected cable set;
power supply determination means for determining whether the power supply can be performed or not based on the read power supply information; and
power supply control means for permitting the power supply to the first device in a case where the power supply determination means determines that the power supply can be performed.

8. The network system according to claim 7, wherein the predetermined rule is that the copying is performed from a side where the set information is written to a side where the set information is not written.

9. A network system, comprising:
a cable set to which a non-volatile memory is mounted;
a network relay apparatus in which an address filter can be set and to which the cable set is connected; and
a device connected to another end of the cable set different from an end to which the network relay apparatus is connected,
the cable set having cable side read/write only communication means for reading/writing data from/to the device; the non-volatile memory storing a cable address which is a unique hardware address allocated to each cable set and the cable address is being registered in the network relay apparatus; and
the device having device side read/write only communication means for reading/writing data from/to the cable set; address read means for reading the cable address from the non-volatile memory of the cable set; address storage means for storing the read cable address; address switch means for switching a hardware address of the address switch means to the cable address stored in the address storage means; set information read means for reading set information used for performing an initial setting of the set information read means from the non-volatile memory; initial setting means for performing an initial setting on the basis of the read set information; set information storage means for storing the set information read from the non-volatile memory; set information write means for writing the set information stored in the set information storage means to the non-volatile memory; and copying means for copying the set information stored in the set information storage means or the non-volatile memory to the other based on a predetermined rule.

10. The network system according to claim 9, wherein the predetermined rule is that the copying is performed from a side where the set information is written to a side where the set information is not written, 11. A network system, comprising:
a network relay apparatus in which an address filter can be set and a non-volatile memory is mounted for each port; and
a device connected to the network relay apparatus via the port,
the network relay apparatus having network side read/write only communication means for reading/writing data from/to the device; address read means for reading a port address of the port from the mounted non-volatile memory; and address transmission means for performing a communication with the device and transmitting the read port address to the device; the non-volatile memory storing the port address which is a unique hardware address allocated to each port and the port address being registered in the network relay apparatus;
the device having device side read/write only communication means for reading/writing data from/to the network relay apparatus; address obtaining means for obtaining the port address transmitted by address transmission means; address storage means for storing the obtained port address; and address switch means for switching a hardware address of the address switch means to the port address stored in the address storage means; set information read means for reading set information used for performing an initial setting of the set information read means from the non-volatile memory of the network relay apparatus; initial setting means for performing an initial setting on the basis of the read set information; set information storage means for storing the set information read from the non-volatile memory: set information write means for writing the set information stored in the set information storage means to the non-volatile memory; and copying means for copying the set information stored in the set information storage means or the non-volatile memory to the other based on a predetermined rule.

12. The network system according to claim 11, wherein the predetermined rule is that the copying is performed from a side where the set information is written to a side where the set information is not written.

13. A network system, comprising:
a device connected to a network together with a network relay apparatus in which an address filter can be set and a hardware address is registered; and
an RFID tag which is affixed at an installation location of the device and stores the hardware address,
the device having address read means for reading the hardware address from the RFID tag via a wireless communication; address storage means for storing the read hardware address;
address switch means for switching a hardware address of the address switch means to the hardware address stored in the address storage means; RFID read/write means for performing a wireless communication with the RFID tag; set information read means for reading set information used for performing an initial selling of the set information read means from the RFID tag; initial setting means for performing an initial setting on the basis of the read set information; set information storage means for storing the set information read from the RFID tag: set information write means for writing the set information stored in the set information storage means to the RFID tag; and copying means for copying the set information stored in the set information storage means or the RFID tag to the other based on a predetermined rule.

14. The network system according to claim 13, wherein the predetermined rule is that the copying is performed from a side where the set information is written to a side where the set information is not written.

15. A control method for a network system which includes:
a cable set to which a non-volatile memory is mounted; and
a device to which the cable set is connected,
the control method instructing the device to execute:
a step of reading set information used for performing an initial setting of the set information read means from the non-volatile memory of the cable set;
a step of performing an initial setting on the basis of the read set information;
a step of storing in set information storage means the set information read from the non-volatile memory;
a step of writing the set information stored in the set information storage means to the non-volatile memory; and
a step of copying the set information stored in the set information storage means or the non-volatile memory to the other based on a predetermined rule.

16. A program embodied in a non-transitory computer-readable medium for instructing a computer to execute the respective steps in the control method for a network according to claim 15.

17. The control method according to claim 15, wherein the predetermined rule is that the copying is performed from a side where the set information is written to a side where the set information is not written.

18. A control method for a network system which includes:
a hub for a network to which a non-volatile memory is mounted; and
a device connected to the hub,
the control method instructing the device to execute:
a step of reading set information used for performing an initial setting from the non-volatile memory of the hub;
a step of performing an initial setting on the basis of the read set information;
a step of storing in set information storage means the set information read from the non-volatile memory;
a step of writing the set information stored in the set information storage means to the non-volatile memory; and
a step of copying the set information stored in the set information storage means or the non-volatile memory to the other based on a predetermined rule.

19. The control method according to claim 18, wherein the predetermined rule is that the copying is performed from a side where the set information is written to a side where the set information is not written.

20. A control method for a network system which includes:
a device; and
an RFID tag which is affixed at an installation location of the device and stores set information used for performing an initial setting of the device,
the control method instructing the device to execute:
a step of reading set information used for performing an initial setting from the RFID tag;
a step of performing an initial setting on the basis of the read set information;
a step of storing in set information storage means the set information read from the RFID tag;
a step of writing the set information stored in the set information storage means to the RFID tag; and
a step of copying the set information stored in the set information storage means or the RFID tag to the other based on a predetermined rule.

21. The control method according to claim 20, wherein the predetermined rule is that the copying is performed from a side where the set information is written to a side where the set information is not written.

22. A control method for a network system which includes:
a cable set to which a non-volatile memory is mounted;
a first device which requires a power supply via the cable set; and
a second device for performing the power supply via the cable set to the first device,
the non-volatile memory storing power supply information related to a power supply request from the first device,
the control method instructing the second device to execute:
a step of reading the power supply information from the non-volatile memory of the connected cable set;
a step of determining whether the power supply can be performed or not based on the read power supply information; and
a step of permitting the power supply to the first device in a case where it is determined that the power supply can be performed.

23. The control method according to claim 22, wherein the predetermined rule is that the copying is performed from a side where the set information is written to a side where the set information is not written.

24. A control method for a network system which includes:
a cable set to which a non-volatile memory is mounted;
a network relay apparatus in which an address filter can be set and to which the cable set is connected; and
a device connected to another end of the cable set different from an end to which the network relay apparatus is connected,
the non-volatile memory storing a cable address which is a unique hardware address allocated to each cable set and the cable address being registered in the network relay apparatus, the control method instructing the device to execute:

a step of reading the cable address from the non-volatile memory of the cable set; and a step of switching a hardware address to the read cable address;

a step of reading set information used for performing an initial setting from the non-volatile memory;

a step of performing an initial setting on the basis of the read set information;

a step of storing in set information storage means the set information read from the non-volatile memory;

a step of writing the set information stored in the set information storage means to the non-volatile memory; and a step of copying the set information stored in the set information storage means or the non-volatile memory to the other based on a predetermined rule.

25. The control method according to claim 24, wherein the predetermined rule is that the copying is performed from a side where the set information is written to a side where the set information is not written.

26. A control method for a network system which includes:

a network relay apparatus in which an address filter can be set and a non-volatile memory is mounted for each port; and a device connected to the network relay apparatus via the port, the non-volatile memory storing a port address which is a unique hardware address allocated to each port and the port address being registered in the network relay apparatus, the control method instructing the network relay apparatus to execute:

a step of reading the port address from the mounted non-volatile memory; and a step of performing a communication with the device and transmitting the read port address to the device; and instructing the device to execute:

a step of obtaining the transmitted port address;

a step of storing the obtained port address; and a step of switching a hardware address to the stored port address;

a step of reading set information used for performing an initial setting from the non-volatile memory of the network relay apparatus:

a step of performing an initial selling on the basis of the read set information;

a step of storing in set information storage means the set information read from the non-volatile memory;

a step of writing the set information stored in the set information storage means to the non-volatile memory; and a step of copying the set information stored in the set information storage means or the non-volatile memory to the other based on a predetermined rule.

27. The control method according to claim 26, wherein the predetermined rule is that the copying is performed from a side where the set information is written to a side where the set information is not written.

28. A control method for a network system which includes:

a device connected to a network together with a network relay apparatus in which an address filter can be set and a hardware address is registered; and an RFID tag which is affixed at an installation location of the device and stores the hardware address, the control method instructing the device to execute:

a step of reading the hardware address from the RFID tag via a wireless communication;

a step of switching a hardware address to the read hardware address;

a step of reading set information used for performing an initial setting from the RFID tag;

a step of performing an initial selling on the basis of the read set information;

a step of storing in set information storage means the set information read from the RFID tag;

a step of writing the set information stored in the set information storage means to the RFID tag; and a step of copying the set information stored in the set information storage means or the RFID tag to the other based on a predetermined rule.

29. The control method according to claim 28, wherein the predetermined rule is that the copying is performed from a side where the set information is written to a side where the set information is not written.

* * * * *